US012578220B2

(12) United States Patent
Burrell

(10) Patent No.: US 12,578,220 B2
(45) Date of Patent: Mar. 17, 2026

(54) CALIBRATION STATUS OF A BELT WEIGHING SYSTEM

(71) Applicant: Control Systems Technology Pty Ltd, Revesby (AU)

(72) Inventor: Leonard Ian Burrell, Revesby (AU)

(73) Assignee: Control Systems Technology Pty Ltd, Revesby (AU)

( * ) Notice: Subject to any disclaimer, the term of this patent is extended or adjusted under 35 U.S.C. 154(b) by 450 days.

(21) Appl. No.: 17/926,360

(22) PCT Filed: May 20, 2021

(86) PCT No.: PCT/AU2021/050475
§ 371 (c)(1),
(2) Date: Nov. 18, 2022

(87) PCT Pub. No.: WO2021/232105
PCT Pub. Date: Nov. 25, 2021

(65) Prior Publication Data
US 2023/0194334 A1    Jun. 22, 2023

(30) Foreign Application Priority Data

May 20, 2020    (AU) ................................ 2020901618

(51) Int. Cl.
*G01G 23/01*        (2006.01)
*B65G 15/08*        (2006.01)
(Continued)

(52) U.S. Cl.
CPC ............. *G01G 23/01* (2013.01); *B65G 15/08* (2013.01); *G01G 11/043* (2013.01);
(Continued)

(58) Field of Classification Search
CPC ........................... G01G 23/01; G01G 23/3721
See application file for complete search history.

(56) References Cited

U.S. PATENT DOCUMENTS

2013/0219985 A1*   8/2013   Li ........................ G01G 11/003
                                                                     73/1.13
2017/0102283 A1    4/2017   Marsolek
                            (Continued)

FOREIGN PATENT DOCUMENTS

CN          1069336 A      2/1993
CN          108138453   *  6/2018
                    (Continued)

OTHER PUBLICATIONS

International Search Report and Written Opinion issued in PCT/AU2021/050475, mailed Jul. 8, 2021, 8 pages.
(Continued)

*Primary Examiner* — John E Breene
*Assistant Examiner* — Alex T Devito
(74) *Attorney, Agent, or Firm* — Meunier Carlin & Curfman LLC

(57) ABSTRACT

Disclosed is a monitoring system for a conveyor belt weighing system, the monitoring system comprising: a status page displaying a plurality of calibration status displays for the conveyor belt weighting system, each of the calibration status displays including a reference calibration value and a comparison between the reference calibration value and a calibration value for the conveyor belt weighing system, wherein the reference calibration value is an ideal value for the calibration value.

20 Claims, 26 Drawing Sheets

(51) Int. Cl.
    *G01G 11/04*          (2006.01)
    *G01G 23/37*          (2006.01)
(52) U.S. Cl.
    CPC ..... *G01G 23/3721* (2013.01); *G01G 23/3735*
          (2013.01); *B65G 2203/0258* (2013.01)

(56) References Cited

U.S. PATENT DOCUMENTS

| | | | |
|---|---|---|---|
| 2017/0176242 A1 * | 6/2017 | Wechselberger | .. G01G 23/3735 |
| 2017/0205814 A1 | 7/2017 | Marsolek | |

FOREIGN PATENT DOCUMENTS

| | | | |
|---|---|---|---|
| CN | 209085734 U | 7/2019 | |
| WO | WO-2006095850 A1 * | 9/2006 | ........... G01G 19/414 |

OTHER PUBLICATIONS

Extended European Search Report issued in EP 21809007.4, mailed Mar. 5, 2024, 7 pages.

* cited by examiner

1400

1500

1800

2000

2010    2020

2100

2240
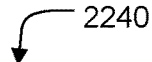
2214
Fig. 22C
2260
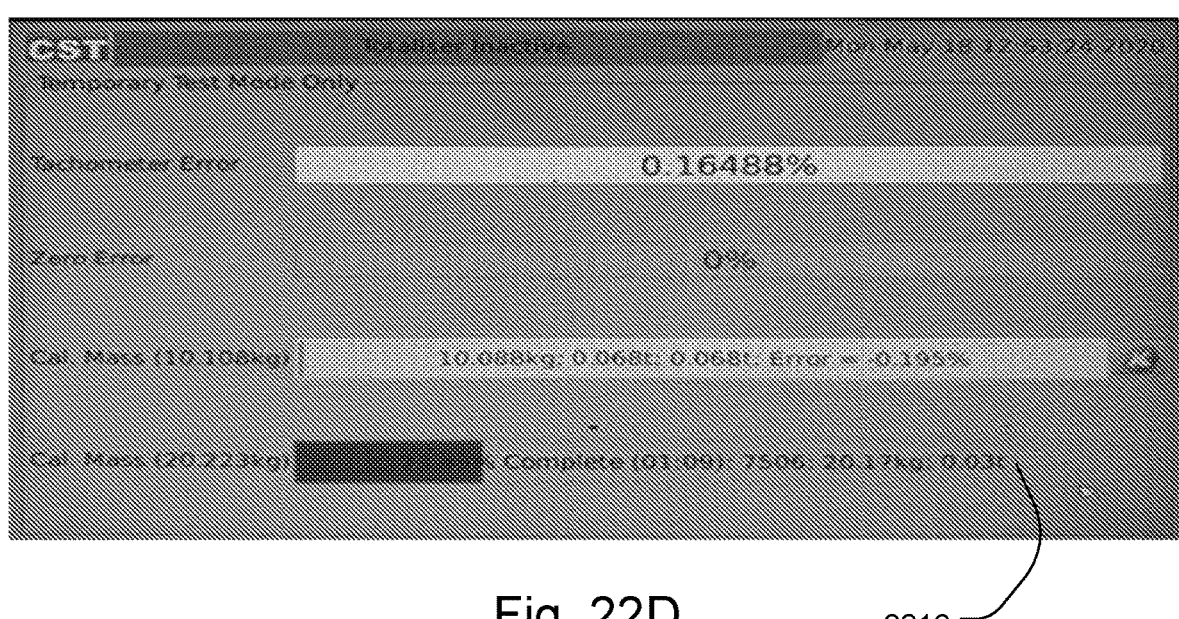
Fig. 22D      2216

2280

2300

Select Automated Test mode — 2310

Suspend normal operation — 2320

Test Tachometer and belt scale zero — 2330

Apply Test Weights — 2340

Test Weights OK — 2350

Test Failed — 2340

Test completed — 2360

Generate Test Results — 2380

2400

CALIBRATION STATUS OF A BELT WEIGHING SYSTEM

TECHNICAL FIELD

The present invention generally relates to the field of conveyor belt weighing systems (i.e. weighing roller belts). More particularly, the present invention relates to a calibration status monitoring system and/or method for a belt weighing system.

BACKGROUND

There have been various approaches in attempting to develop reliable and accurate conveyor belt weighing systems. Accurate motion weighing equipment is required for bulk handling of materials in many diverse industries, for example in mining, ship loading, rail loading, grain, coal power, quarry, food industries, etc. Conveyor belt weighing systems are used to handle materials in many diverse fields ranging from mining to food and feed production. The conveyor belts are typically used to transport materials from a first area to a second area. Often the material transported by the conveyor belt must be weighed. This enables the amount of material delivered to the second area to be monitored. Conveyor belts typically comprise a plurality of idler rollers provided intermediate to a driven roller and a following roller to support the conveyor belt and the materials transported thereon, and to limit sag of the conveyor belt. The longer the span and the heavier the materials being supported on the conveyor belt the more idler rollers that are provided.

In order to weigh the material while on the conveyor belt it is preferable to weigh the materials on the conveyor belt at a location away from either end of the conveyor belt. It is preferable not to take weight measurements at or near to either the driven roller or the following roller due to the sudden changes in loads often experienced at these locations. It is generally accepted practice to measure the weight of materials passing over a conveyor belt at a point between the driven roller and the following roller.

In order to weigh the materials it is common practice to disconnect an entire idler roller assembly from the frame of the conveyor, mount a sub-frame having load cells onto the conveyor frame, and support the entire idler roller assembly on the load cells supported by the sub-frame.

Presently, there is uncertainty as to the quality of a calibration of a belt weighing system, for example a calibration achieved on a mine site. Presently, calibration is mainly performed by checking repeatability of results, however, results which contain faulty behaviour can produce faulty calibration. Present calibration methods are not transparent to the user, and it is not clear to the user how calibration should be performed, particularly when there is no reference standard to check results against.

Referring to FIG. 1 (prior art) by way of example, there is illustrated a known conventional fully suspended weigh frame 110 forming part of a conveyor belt weighing system 100. Conveyor belt weighing system 100 includes idler rollers 120 spaced apart to support belt 130. Idler rollers 140 are part of fully suspended weigh frame 110. Conveyed material being transported along conveyor belt 130 imparts its weight via conveyor belt 130 and idler rollers 140 and can be measured by weigh frame 110. A fully suspended weigh frame has the property that if an idler roller mounted on the weigh frame were to jamb then the resulting frictional force in line with the conveyor belt would have practically no effect on the output weight signal. Also, the normal idler roller rolling friction, nominally 2 to 3% of the load on the conveyor belt, is not reflected in the output weight signal from the weigh frame. In a fully suspended weigh frame, weight applied at any location on the weigh frame will produce the same output weight signal. Such designs are only sensitive to loads perpendicular to the conveyor belt.

Referring to FIG. 2 (prior art) by way of further example, there is illustrated an isometric view of a known conveyor belt weighing system 200 (the belt not being illustrated). Conveyor belt weighing system 200 includes a fully suspended weigh frame 210, including a plurality of spaced idler rollers 220. Idler rollers 220 are used throughout the conveyor section illustrated and support a conveyor belt in relation to the fully suspended weigh frame 210. Winged support components 230 can also be provided.

There is a need for new or improved monitoring systems and/or methods for conveyor belt weighing systems, which address or at least ameliorate one or more problems in the prior art.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

SUMMARY

In an example aspect there is provided a monitoring system for a belt weighing system. The monitoring system can be a calibration status monitoring system, and the belt weighing system can be a conveyor belt weighing system.

In another example aspect there is provided a method of monitoring a belt weighing system, for example a method of monitoring a calibration status of a conveyor belt weighing system.

In another example aspect there is provided a monitoring system for a conveyor belt weighing system, the monitoring system comprising: a status page displaying a plurality of calibration status displays for the conveyor belt weighting system, each of the calibration status displays including a reference calibration value and a comparison to between the reference calibration value and a calibration value for the conveyor belt weighing system, wherein the reference calibration value is an ideal value for the calibration value.

Preferably, each of the plurality of calibration status displays have an associated colour coded status indication.

Optionally, a sub-system status page is accessible from the status page.

Optionally, a difference between the reference calibration value and the calibration value for the weighing system is displayed on the calibration status display.

In another example, the associated colour coded status indication displays a difference between the reference calibration value and the calibration value for the weighing system.

In another example aspect there is provided a method of determining a calibration status for a sub-system of a conveyor belt weighing system, the method comprising: receiving a reference calibration value for the sub-system, the reference calibration value being set an ideal value for the sub-system; receiving a calibration value for the sub-system; determining a difference between the calibration value and the reference calibration value; and displaying the determined difference to an operator of the conveyor belt weighing system to allow the operator to view a change from the reference calibration value.

In another example aspect there is provided a system and/or method for displaying one or more test results for a conveyor belt weighing system. In another example aspect there is provided an automated testing system for a conveyor belt weighing system.

BRIEF DESCRIPTION OF FIGURES

Example embodiments are provided in the following description, which is given by way of example only, of at least one preferred but non-limiting embodiment, described in connection with the accompanying figures.

FIGS. 22A to E illustrate an example weight test page for the automated testing system;

PREFERRED EMBODIMENTS

Figure 1:
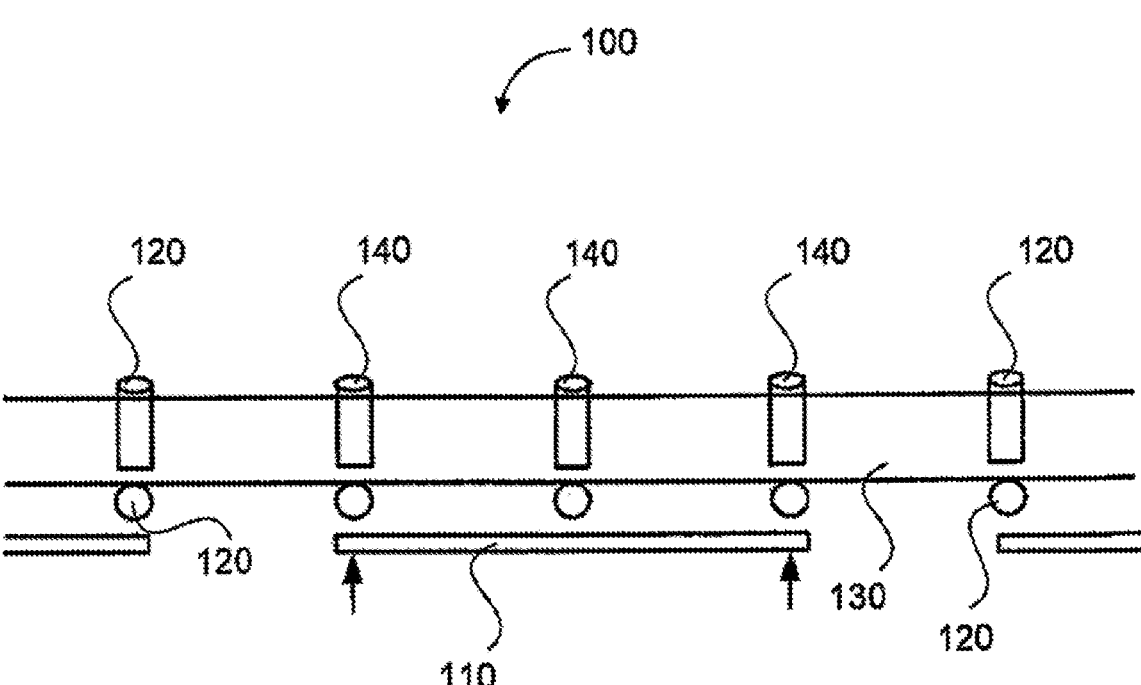
FIG. 1 (prior art) illustrates a conventional fully suspended weigh frame having idler rollers.
Figure 2:
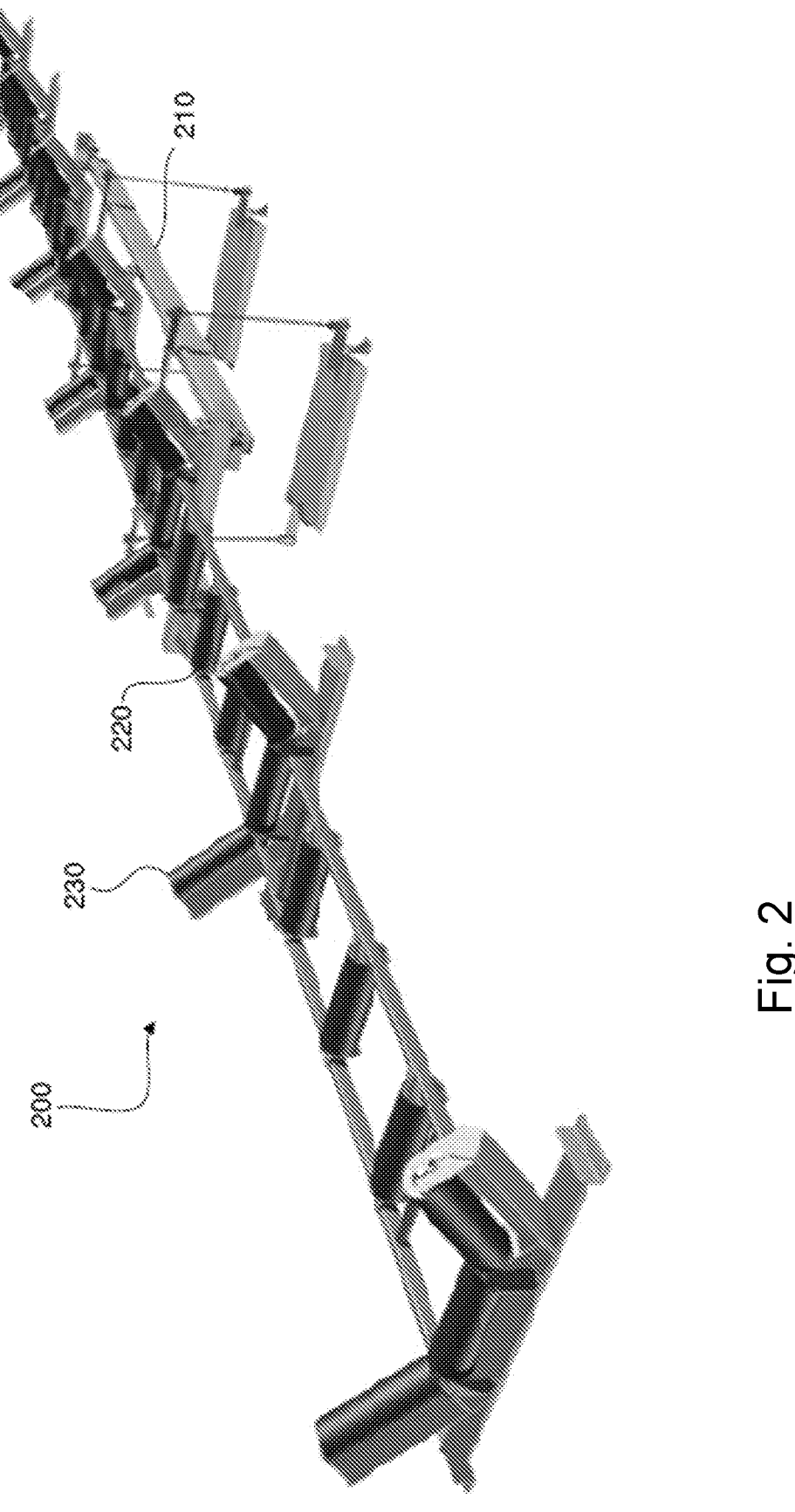
FIG. 2 (prior art) illustrates an isometric view of a known conveyor belt weighing system (the conveyor belt not illustrated)

The following modes, given by way of example only, are described in order to provide a more precise understanding of the subject matter of a preferred embodiment or embodiments.

Example Belt Weighing System

In an example, a belt weighing system comprises a fully suspended weigh frame including a plurality of spaced first belt support components, e.g. rollers. The plurality of spaced first belt support components support belt in relation to the fully suspended weigh frame. Optionally, an entry transition support structure is positioned on a first side of the fully suspended weigh frame and includes one or more second belt support components, e.g. further rollers. Also optionally, an exit transition support structure is positioned on a second side of the fully suspended weigh frame and includes one or more third belt support components, e.g. further rollers.

The entry transition support structure and the exit transition support structure are independent structures from the fully suspended weigh frame. In an example, the plurality of spaced first belt support components, the one or more second belt support components, and/or the one or more third belt support components are idlers or rollers. In a particular example embodiment, the one or more second belt support components and/or the one or more third belt support components are a plurality of closely spaced idlers.

Spaced idlers can be provided as a spaced idler (i.e. roller) rack, which is a framework including a plurality of idlers. A spaced idler rack can be pivoted at one or more points, for example at pivot points.

In another example, the entry transition support structure and/or the exit transition support structure can include one or more winged support components, for example which may be angled idlers placed at an angle to a base idler. In another example, the one or more second belt support components, and/or the one or more third belt support components can be slider beds instead of idlers. If slider beds are used the slider beds are preferably pivoted.

At least one belt support component included as part of the weigh frame could be a plurality of spaced idlers or one or more slider beds. The belt weighing system may also include a plurality of closely spaced belt support components (e.g. idlers or idler sets) to support the belt adjacent or near the weigh frame in an entry transition region and an exit transition region. The plurality of spaced idlers can be closely spaced and used to reduce, control or ameliorate belt sag to reduce relative movement of material on the belt or other non-linear dynamic effects. Beyond the transition regions, standard spacing of idlers can be used.

An example weigh frame can be a 'fully suspended' weigh frame forming part of a belt weighing system. Belt weighing system includes idlers spaced apart to support the belt. In a fully suspended weigh frame, weight applied at any location on the weigh frame produces the same output weight signal. Such designs are sensitive to loads perpendicular to the conveyor belt. Another example weigh frame is a dual pivoted "approach-retreat" type weigh frame forming part of a belt weighing system.

In another example, an idler roller can be utilised which is able to receive a load cell inserted inside an end of a single shaft of the idler roller, preferably the single shaft is cylindrical, instead of the load cell being positioned between a bearing assembly and the supports or the frame. In an example two load cells can be separately inserted inside each of the two ends of a single shaft of the idler roller. This arrangement provides improved rigidity and better load cell clamping. The arrangement also allows the bearing to be placed in the same position as a standard conveyer belt idler roller. The arrangement also allows for the use of standard shafts for the bearing. In the present embodiments, loads (i.e. weight forces) are not transmitted to the load cell from bending of the shaft of the idler roller, or the shell of the idler roller, or a mechanical seal. This provides higher accuracy and reliability of weight measurements of material transported by a conveyor belt supported by the idler roller.

In one example there is provided an idler roller with at least one internal load cell which is able to measure the weight of material passing over the idler roller. Preferably, the idler roller comprises a shaft with two load cells embedded or inserted into the shaft, one load cell embedded or inserted at each end of the shaft of the idler roller. The shaft, preferably a round or cylindrical shaft, is of sufficient strength to reduce the deflection of the shaft at a bearing support point, thereby preventing excessive deflection that would otherwise reduce the life of the bearing. The shaft is preferably a single shaft formed as a cylinder or a pipe with at least one internal pocket, or at least one internal recess, provided at each end of the shaft, which can otherwise be solid along the rest of the shaft.

Placement of the load cell inside, or at least partially internal to, or internal to, the shaft of the idler roller protects the load cell from damage. The shaft is static, that is fixed relative to a frame, and a rotating shaft seal, for example a soft silicon seal, prevents or reduces ingress of moisture (i.e. water) and/or dirt into a strain gauge area of the load cell. The rotating shaft seal material should be soft enough, or suitably elastic or pliable or flexible or malleable, so as to not interfere with sensitivity of or measurements by the load cell. The rotating shaft seal should be protected against mechanical damage. In one embodiment this is achieved by positioning the rotating shaft seal in or near an end of a pocket of the shaft, where the rotating shaft seal is protected from mechanical damage.

It is also preferable that two load cells, when used, one at each end of the idler roller, be exactly vertical. This can be achieved by placing the shaft with load cells fitted in a jig before mechanically fixing, bolting or adhering the load cells in position in the shaft of the idler roller.

A load cell is rigidly fixed in an end of the shaft, thus eliminating or reducing any errors caused by poor clamping. A separate mechanical shaft seal positioned between moving parts is not required to seal dirt and moisture from the load cell itself, as the load cell is positioned inside the shaft and is fixed to the static shaft, thus the load cell is also static. A static seal can be provided between the body of the static load cell and the static shaft, however any such additional static seal is between components that are fixed in position relative to each other, not between moving components. This also means that any forces caused by such an additional static seal are not detected by or transferred to the load cell inside the shaft as they are fixed in position relative to each other. The shaft is preferably made of a metal, an alloy or a composite material.

Figure 3:
FIG. 3 illustrates a longitudinal cross-section plan view of one end of an example idler roller, showing an example sealing arrangement for a load cell.
Figure 3:
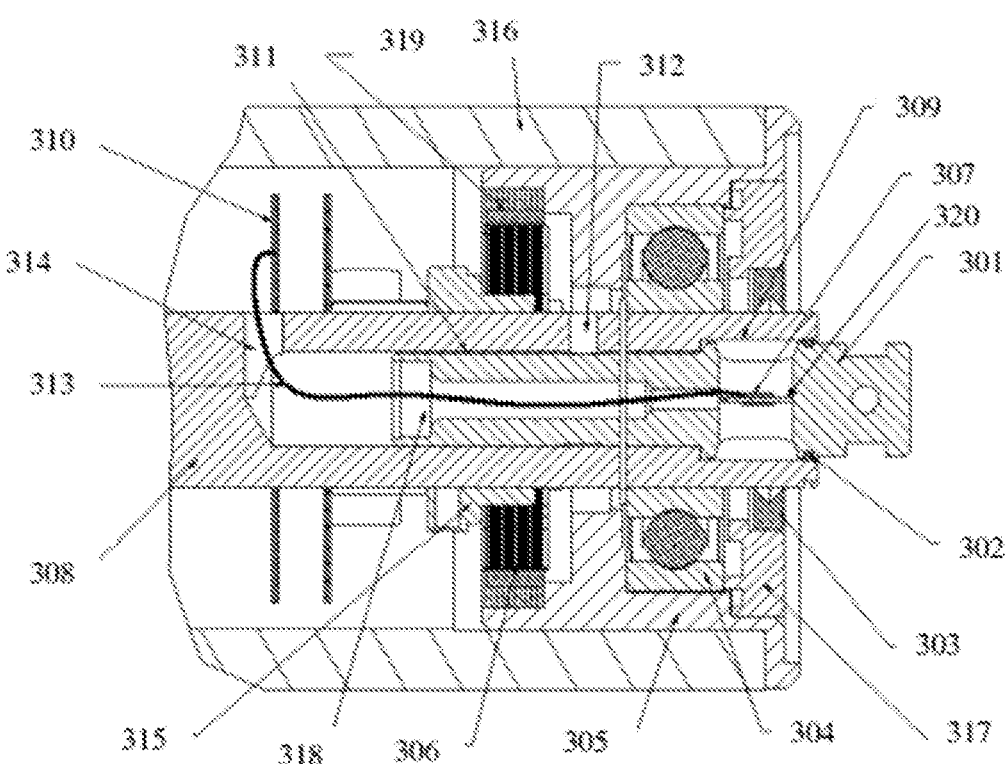

Referring to FIG. 3, there is illustrated a longitudinal (i.e. along the longitudinal axis) cross-section plan view of an end region of an example idler roller 300. A static shaft 308 is provided with first pocket (or first recess) 309 and second pocket (or second recess) 311, preferably by being machined into static shaft 308. A load cell 301 is inserted into static shaft 308 and into first pocket 309 and second pocket 311. One or more strain gauges 307, for example two strain gauges 307, are fixed, bonded, attached or adhered to a waist section 320 of the body of load cell 301. The waist section can be a narrowed section of the body of load cell 301 and is a weakened section. The art refers to this portion of a load cell as the 'web'. A web is a narrow portion of the load cell that will elastically deform under the application of external loads. Ideally this deformation will have a linear relationship between the applied load and the derived signal gained from an applied strain gauge. Elastic deformation, as known in the art, is when the original shape of the web is restored upon the removal of the load. Care in design is taken to ensure a permanent deformation does not occur wherein a plastic deformation of the web occurs from the applications of excess load.

It should be appreciated that the opposite end of idler roller 300 (not illustrated) can be the same as, and have the same components as, for example including a second load cell and associated components, the end of idler roller 300 as is illustrated in FIG. 3.

The waist section of the body 320 of load cell 301 is positioned or contained within first pocket 309, which has a clearance to allow deflection of an end of load cell 301. A static seal 302, for example a static sealing ring, which is preferably a soft sealing ring, seals the one or more strain gauges 307 from the ingress of moisture and dirt. Static seal 302 does not transfer any forces to load cell 301 inside static shaft 308 as they are fixed in position relative to each other. A rotating shaft seal 303 is placed outside of static shaft 308 in the vicinity of, or within the longitudinal extent of, pocket 309, and inside idler roller 300 such that rotating shaft seal 303 is protected from damage.

Load cell 301 is fixed to static shaft 308 and is positioned at least partially internal to static shaft 308 and at an end of static shaft 308. Load cell 301 is for supporting idler roller 300 on a frame. Rotating shaft seal 303 is positioned on an exterior surface of static shaft 308 and internal to idler roller 300, for example being inside of an end plate of idler roller 300. Static seal 302 is positioned between load cell 301 and an interior surface of static shaft 308. In one example, rotating shaft seal 308 is positioned within the longitudinal extent of first pocket 309. In one example, rotating shaft seal 308 is positioned within the longitudinal extent of the waist section of the body of load cell 301. In one example, static seal 302 is positioned outside the longitudinal extent of the waist section of the body 320 of load cell 301. In one example, static seal 302 is positioned closer to an end of static shaft 308 than the rotating shaft seal 303.

Rotating shaft seal 303 may be located on the inside of the shaft bearing 304 and is not bound to be located over pocket 309.

Load cell 301 is fixed securely into second pocket 311, for example by adhesive, or by being mechanically attached or fixed. For example load cell 301 can be held in place with a screw inserted through hole 312, separately or additionally with an adhesive, or for example until adhesive, if being used, has hardened after which the screw might be optionally removed. Example adhesives include those based on acrylic, cyanoacrylate, epoxy, hot melt, silicone and urethane. A plurality of screws, such as that inserted through hole 312, may be used such that a mechanical bond between load cell 301 and second pocket 311 can be made without the use of adhesives. This renders the weighing roll serviceable to a level where load cells can be replaced.

Rotating shaft seal 303 is positioned on or near an end of shaft 308, and any bending loads caused by rotating shaft seal 303 are not measured by load cell 301 inserted inside static shaft 308. The forces on roller shell 316, from material passing over idler roller 300, are transmitted directly to load cell 301 through bearing 304, with no added forces arising from rotating shaft seal 303. Roller shell 316 is rotatable about static shaft 308.

An electronics board 310, positioned internal to idler roller 300 or internal of roller shell 316, which is used to take readings from one or more strain gauges 307, is connected by wires 313 through holes 314 in static shaft 308 and holes 318 in the body of load cell 301. Electronics board 310 is mounted on flange 315, which can be machined, and which is used to fix both a permanent magnet generator 306 and the electronics board 310 to static shaft 308. Permanent magnet generator 306 and electronics board 310 are internal to idler roller 300. A bearing housing 305 has shell 316 fixed to it and also contains bearing 304. The rotor of generator 319 is fixed to bearing housing 305. The stator of permanent magnet generator 306 is fixed to the shaft 308. This arrangement provides reliable and accurate tachometer readings from generator 306. The one or more strain gauges 307 are located internal to static shaft 308. Bearing retainer 317 is snapped into bearing housing 305.

In another example, the generator is provided with magnets bonded in a steel ring to prevent flux leakage on the outer shell. This leakage could otherwise cause the idler roller to pick up metallic or iron particles and clog the idler roller. A larger generator can be used without producing cogging torque. A permanent magnet generator is provided to supply the electrical power needed by the internal electronics. A combination of magnets and stator poles (for example, preferably 22 magnets and 27 slots stator in one embodiment) is preferred. This reduces or eliminates the cogging torque which reduces the chances of belt slip. A conventional laminated iron stator can be used. This reduces the cost and size for a given output power and increases the efficiency of the generator. In one example, the idler roller, for a conveyor belt weighing system, thus includes a generator and power, e.g. power waves, from the generator can be used to derive a tachometer computation.

By providing idler roller 300 the installation of a weighing idler roller is significantly simplified. For example, instead of removing an entire idler roller assembly and mounting the idler roller assembly onto a sub-frame with load cells, an existing idler roller (or for example a centre idler roller if the idler roller assembly comprises a centre idler roller and a pair of side or wing idler rollers) can be removed from the existing idler roller assembly and replaced by the present embodiment idler roller. The load cell 301 mounted in static shaft 308 internal to rotatable roller shell 316 permits the weight of the materials on the conveyor belt above the idler roller to be weighed with accuracy. No additional sub-frame is required and it is not necessary to drill into the conveyor belt frame.

Furthermore, due to the sealing arrangement provided and as load cell 301 is located internal to idler roller 300, and at least partially internal to static shaft 308, this additionally protects load cell 301, particularly one or more strain gauges 307, from damage caused by materials that may fall from the conveyor belt and there will not be a tendency for degradation in performance caused by material build up on or around load cell 301. Furthermore, the idler roller and sealing arrangement provided protects against moisture ingress and any degradation in components that would otherwise occur due to moisture.

Examples of the present idler roller are used as part of a conveyor belt weighing system that also includes multiple spaced conventional (non-weighing) idler rollers for normal use in supporting material transported on the conveyor belt. The present "weighing idler rollers" can replace one or more known conventional (non-weighing) idler rollers. One or more winged idler rollers, for example idler rollers placed at an angle to a base or middle idler roller, can be provided as, optionally, either a weighing idler roller or as a conventional (non-weighing) idler roller.

In one example, a static seal is positioned between the load cell and an interior surface of the static shaft. In another example, the static shaft includes an internal first pocket into which the load cell is inserted and fixed. In another example, the static shaft also includes an internal second pocket into which the load cell is inserted and fixed. In another example, the load cell includes one or more strain gauges. In another example, the load cell is rigidly fixed in the end of the static shaft. In another example, the rotating shaft seal is positioned within the longitudinal extent of first pocket. In another example, the rotating shaft seal is positioned within a longitudinal extent of a waist section of a body of the load cell. In another example, the static seal is positioned outside a longitudinal extent of a waist section of a body of the load cell. In another example, the static seal is positioned closer to an end of the static shaft than the rotating shaft seal. In another example, a roller shell is rotatable about the static shaft.

In another example, an electronics board is positioned internal to the idler roller and takes readings from the one or more strain gauges. In another example, the one or more strain gauges are located internal to the static shaft. In another example, a permanent magnet generator is internal to the idler roller and fixed to the static shaft.

In further non-limiting examples the present idler roller can provide an autonomous weighing idler roller for process applications. The weighing idler roller can be self powered and optionally provided without external cables. Internal electronics can provide wireless connectivity, for example using Wi-Fi or Xbee wireless communication, and/or optical communication. Other features that can be provided by internal components and/or electronics include temperature monitoring, for example for compensation, a three-axis accelerometer, for example for compensation for orientation and vibration, a tachometer, which for example could be an independent wireless tachometer, and one or more internal processes for real-time weighing of transported material. An accurate load cell is provided for quality weight measurements.

In a further non-limiting example, a weighing idler roller can be self-powered using an internal generator. An example generator could be provided as an internal permanent magnet generator to supply power requirements for the weighing idler roller. The weighing idler roller must be allowed to turn freely and preferably a three-phase smooth permanent magnet generator can be utilised. Internal batteries can be provided, for example for a start-up phase of the weighing idler roller. Improved efficiency can be achieved for example by using a DC-DC converter design.

Figure 4:
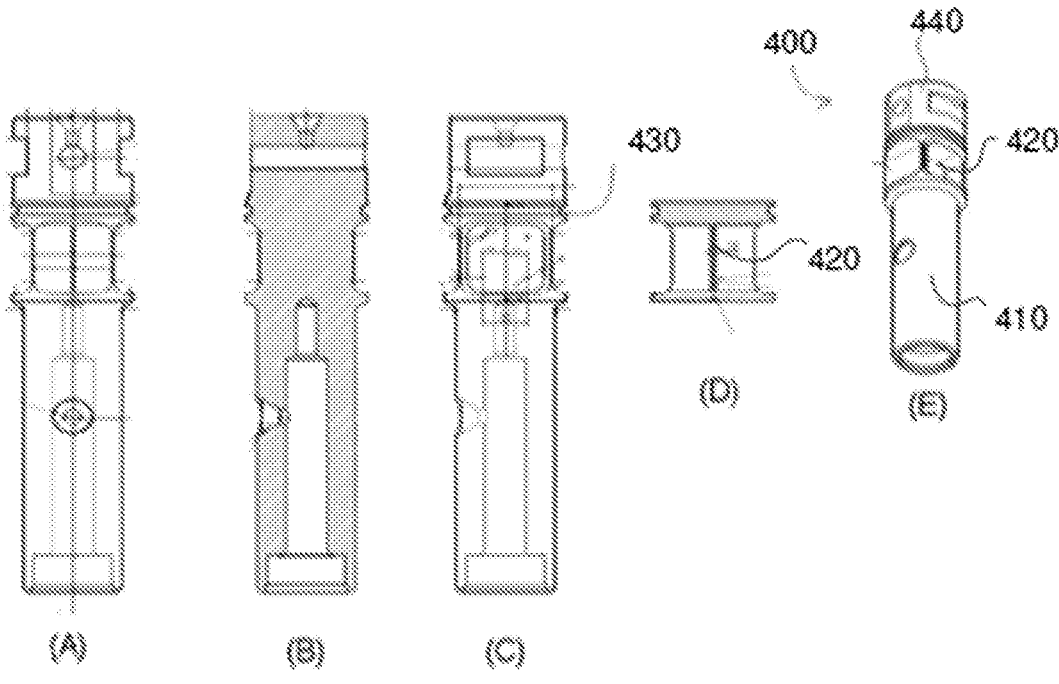
FIG. 4 illustrates an example load cell.

In further non-limiting examples, a load cell is inserted into an end of the static shaft that is hollow, bored out, or recessed, and the load cell detects forces perpendicular to the axis of the static shaft. The load cell is replaceable and is a mechanically shielded insert. An example load cell is illustrated in FIG. 4. FIG. 4A shows a plan view of an example load cell design. FIG. 4B shows an elevation cross-section along the longitudinal axis of the example load cell. FIG. 4C shows an elevation view of the example load cell. FIG. 4D shows a cross section of a plan view of a waist section of the body of the load cell. FIG. 4E shows an isometric view of the example load cell. Load cell 400 includes a cylindrical portion 410 and a waist section 420 which are inserted internally into an end of a static shaft of a weighing idler roller. Section 410 is received in an internal second pocket of the static shaft, and waist section 420 is received in an internal first pocket of the static shaft. The static seal is received in annular recess 430. Support section 440 is fixed to the frame, or sub-frame, of a conveyer belt weighing system. When one or more strain gauges are fixed in waist section 420, the load cell 400 is continuously powered and provides for continuous weight measurements. The load cell can have a circular outer casing providing a shaft with a sealing arrangement.

One or more printed circuit boards, for example a power supply printed circuit board and a processor and instrumentation printed circuit board, can be provided internal to a weighing idler roller. For example, the printed circuit boards can be provided in the shape of an annular disc that fits around the static shaft and are internal to a roller shell of the weighing idler roller. The power supply printed circuit board can include features such as three-phase AC in, and high efficiency DC out, a tachometer, a wake-up circuit, a stay powered-on feature, for example for when a conveyer belt is stopped for maintenance, and a battery to support initial start-up phase and maintenance access. The power supply printed circuit board can be mounted to, for example, the permanent magnet generator. The processor and instrumentation printed circuit board can include features such as on board memory, an accelerometer providing three-axis measurement, a temperature monitoring device, and one or more wireless communication devices, for example one or more Wi-Fi transmitters/receivers and/or one or more Xbee wireless transmitters/receivers (i.e. IEEE 802.15.4 based communication protocols used to create personal area networks with small, low-power digital radios).

Preferably, in one example, there are two active Wi-Fi interfaces provided for a weighing idler roller. A first Wi-Fi interface provides an 'access point' to which a computerised device, smart phone, tablet, computer, etc., may connect, and which provides communication/control via a user interface provided on the computerised device, smart phone, tablet, computer, etc. A second Wi-Fi interface provides a 'station' mode which can search for another external access point, preferably a customer's or user's access point, to connect with which is part of the customer's or user's network. The second Wi-Fi is preferably, but not necessarily, configured with access point SSID, user's name and password, and can automatically connect. The second Wi-Fi connection can be used for Modbus TCP over IP data to a Digital Control System (DCS). Optionally, the second Wi-Fi may also support a remote user interface. The first Wi-Fi interface effectively acts as a connect in, and the second Wi-Fi interface effectively acts as a connect out. The second Wi-Fi interface, providing the connect out or 'station' mode, looks to permanently connect to the customer's or user's network, for example an industrial computer system, to provide a permanent data source and/or data store.

The weighing idler roller is intentionally designed to look like a standard idler roller as used in a conventional conveyer belt weigh system. This allows for straight forward swapping of a known conventional idler roller for the weighing idler roller.

Control software can be provided for control and measurement aspects provided by the weighing idler roller. An operator interface can be provided, for example as an application provided on a smart device or a personal computer. A user can use the application to wirelessly interface with the control and measurement devices of the weighing idler roller. Multiple weighing idler rollers can be part of a network which effectively act together as a single belt weigher.

The weighing idler roller can detect whether it is acting as a middle or base roller or as a wing roller. The inclination of the conveyer belt can also be measured and compensated for. If a weighing idler roller is acting as a wing roller the effective weight measured by the weighing idler roller can be calculated as a function of the wing angle. Detection of whether the weighing idler roller is in a wing position or a middle or base position can be achieved by use of the three-axis accelerometer provided internal to the weighing idler roller.

When multiple weighing idler rollers are applied together (refer to FIGS. 6, 7, and 8) the weighing idler rollers can communicate to a selected master weighing roller via a digital radio network, such as using XBee™ radio modules (based on the IEEE 802.15.4 2003 standard designed for point-to-point and star communications). Individual weighing idler rollers can carry out real-time belt weigher processes. The master weighing idler roller 610 accumulates and consolidates the weigh results from all of the weighing idler rollers, including master weighing idler roller 610, wing weighing idler roller 611, and wing weighing idler roller 612, to produce a single belt scale entity. In this arrangement, any of the weighing idler rollers in the group can be set to act as the master weighing idler roller. Groups of weighing idler rollers can be configured on-site, for example using an application on a smart phone to wirelessly communicate with a weighing idler roller. In such a configuration, in one example the master weighing idler roller 610 only has its Wi-Fi interface enabled. The group of weighing idler rollers thus has a single access point and Wi-Fi interface and multiple XBee™ radio module interfaces. A star network can be utilised with one idler roller designated as the master or coordinator weighing idler roller for the star network, for example master weighing idler roller 610.

Thus, in an embodiment there is provided an idler roller that transmits information over an internally generated wireless network. In another embodiment there is an idler roller that transmits information to an external wireless network.

In an example embodiment having no external wires if the roller shell is made of metal the Wi-Fi transmission would be restricted. Thus, in one example the roller shell is made from a high impact plastic material or composite material, which is transparent to electromagnetic waves. This allows the Wi-Fi transmitter/receiver to communicate with transmitters/receivers at some distance from the weighing idler roller.

In another example embodiment there is provided an idler roller, for a conveyor belt weighing system, which comprises a static shaft and two load cells fixed to the static shaft. Each one of the two load cells (i.e. a first load cell and a second load cell) separately produces an analogue signal, and each one of the two load cells is connected to an analogue to digital converter, which could be a common analogue to digital converter or separate analogue to digital converters. The analogue to digital converter(s) produces a digital output representing the analogue signal from the two load cells.

The digital output of the analogue to digital converter(s) can be zero adjusted by digital computation, for example provided by a digital processor or a software procedure. The digital output of the analogue to digital converter(s) can be used to compute a span calibration to a standard. Preferably, though not necessarily, digital computation is used to eliminate a requirement for use of passive components to balance a Wheatstone bridge.

In another example embodiment there is provided a plurality of idler rollers for a conveyor belt weighing system, comprising at least a first idler roller and at least a second idler roller. The plurality of idler rollers wirelessly communicate and/or optically communicate to each other to form a cluster of active idler rollers, which can act as one device, for example the previously described group of weighing idler rollers.

Figure 5:
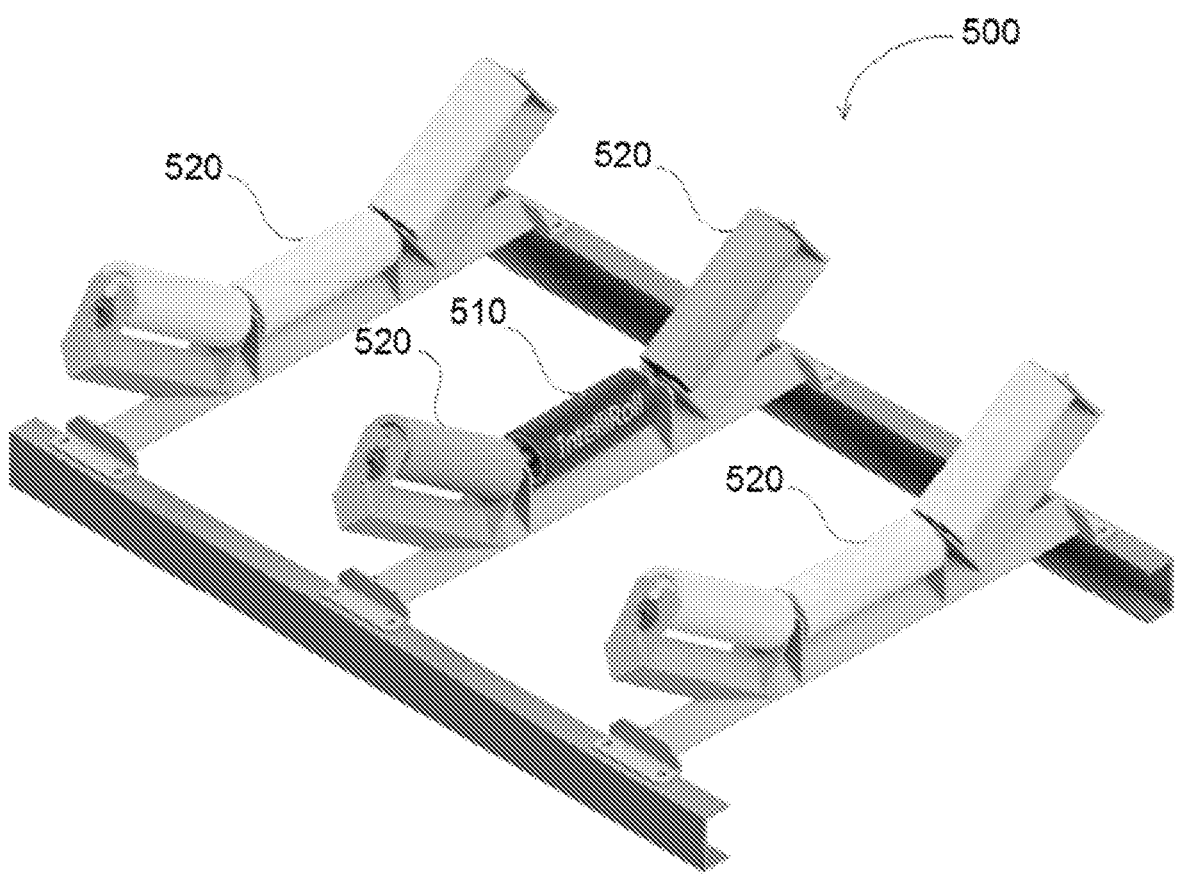
FIG. 5 illustrates a portion of an example conveyer belt weighing system.

Referring to FIG. 5 there is illustrated a section of a conveyer belt weighing system 500. Weighing idler roller 510 is provided as a middle idler roller and all other idler rollers are conventional (non-weighing) idler rollers 520 as are known in the prior art and which simply support the conveyer belt. Thus, in one example implementation, a single weighing idler roller can be provided as a base or central roller.

Figure 6:
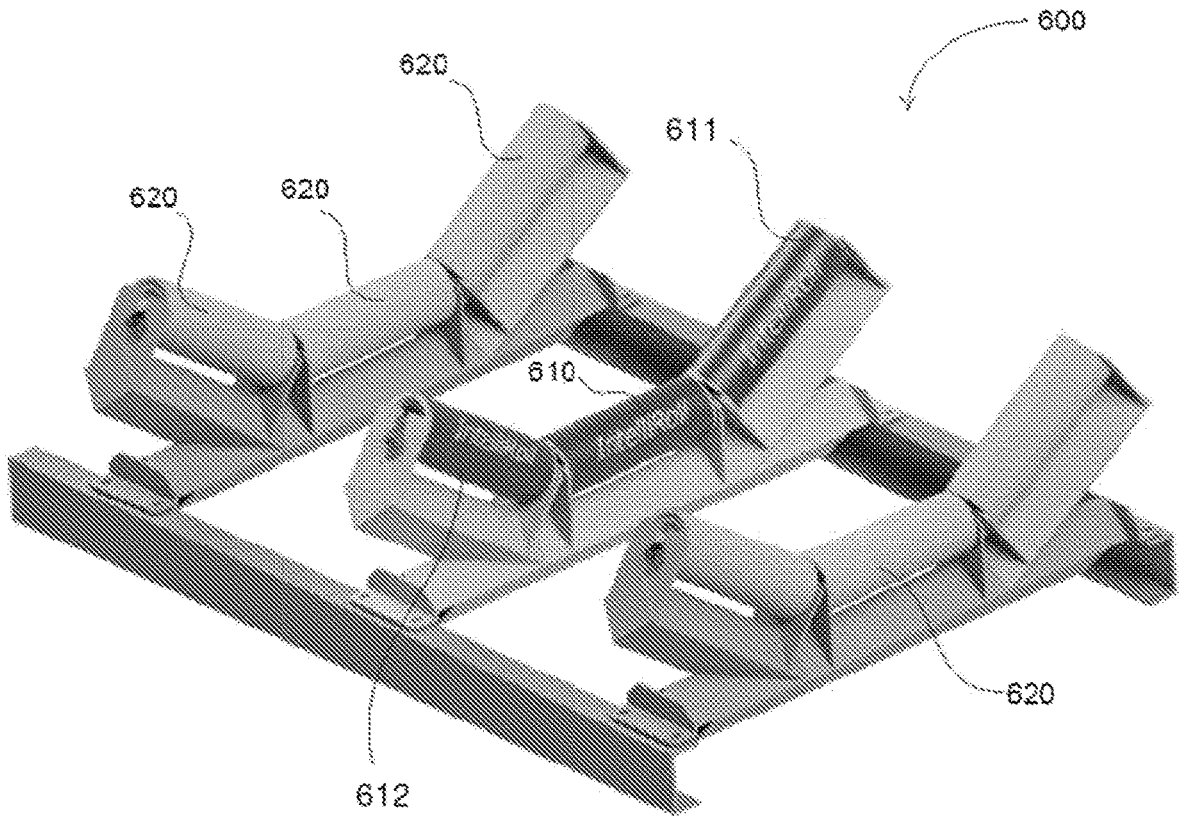
FIG. 6 illustrates a further example of a conveyor belt weighing system.

Referring to FIG. 6 there is illustrated a section of another example conveyer belt weighing system 600. In this example master weighing idler roller 610 is provided as a base or central roller in addition to wing weighing idler rollers 611, 612 being provided, as illustrated. Conventional (non-weighing) idler rollers 620 are provided at other locations along the conveyer belt.

Figure 7:
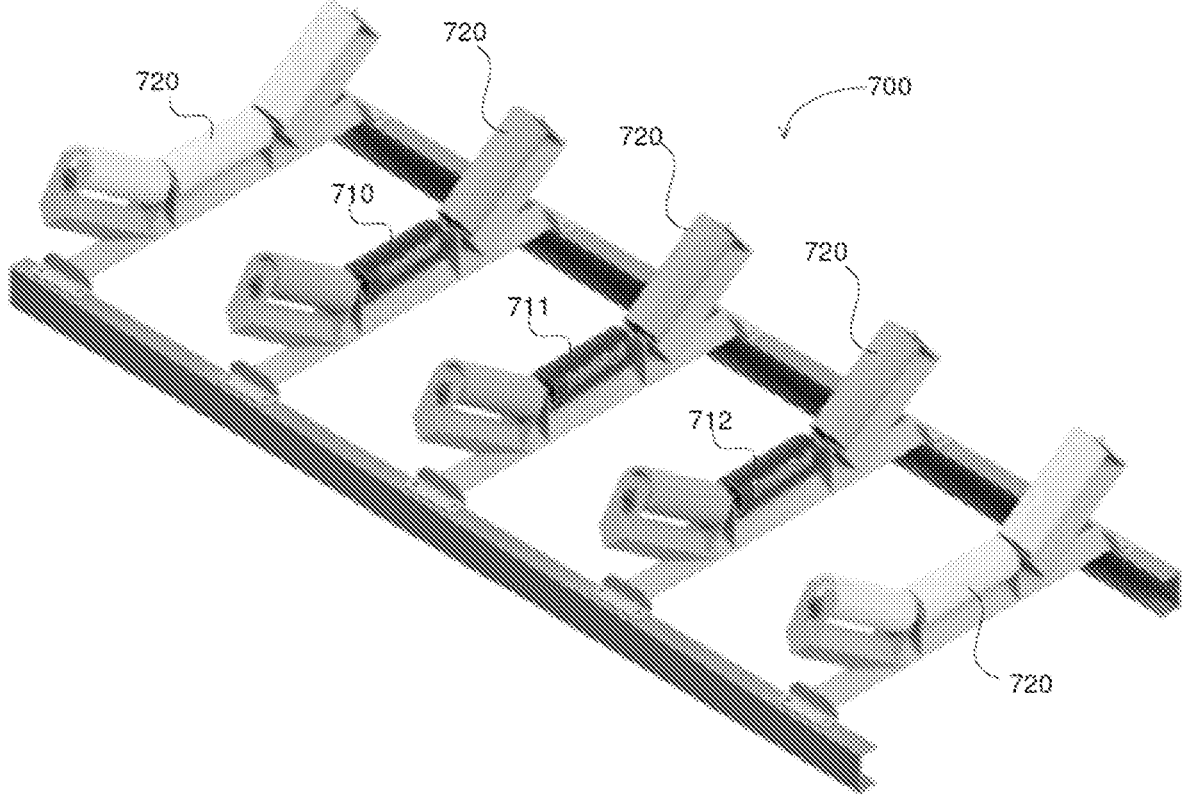
FIG. 7 illustrates a further example of a conveyor belt weighing system.

Referring to FIG. 7 there is provided a section of another example conveyer belt weighing system 700. In this example first weighing idler roller 710, second weighing idler roller 711, and third weighing idler roller 712 are provided as a plurality of base or central idler rollers. Other base or central idler rollers 720 are provided as conventional (non-weighing) idler rollers, and wing idler rollers 720 are also conventional (non-weighing) idler rollers. The number of weighing idler rollers that are provided as different base or central rollers can be varied depending on the implementation desired, for example, one, two, three, four, five, etc., base or central weighing idler rollers can be used.

Figure 8:
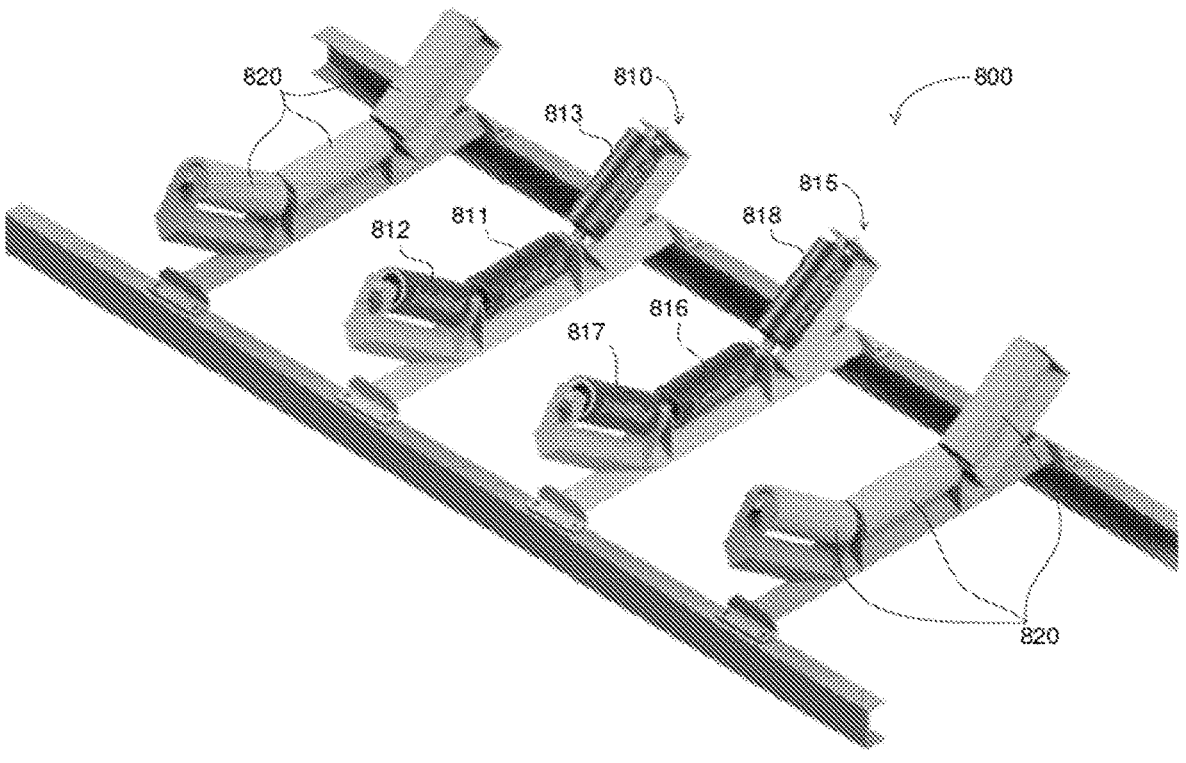
FIG. 8 illustrates a further example of a conveyor belt weighing system.

Referring to FIG. 8 there is illustrated a section of another example conveyer belt weighing system 800. In this example sets of weighing idler rollers can be provided as multiple sets of base or central idler rollers and associated wing idler rollers. First set of weighing idler rollers 810 and second set of weighing idler rollers 815 are illustrated. First set of weighing idler rollers 810 includes master weighing idler roller 811, provided as a base or central roller, in addition to wing slave weighing idler rollers 812, 813. Second set of weighing idler rollers 815 includes a slave weighing idler roller 816, provided as a base or central roller, in addition to wing slave weighing idler rollers 817, 818. As illustrated, two sets of weighing idler rollers 810, 815 are provided, however it should be realised that one, two, three, four, five, etc., sets of weighing idler rollers can be provided. Conventional (non-weighing) idler rollers 820 are used as normal at other locations along the conveyer belt. Using a plurality of weighing rollers seeks to increase the signal to noise performance of the weighing computations.

Figure 9:
FIG. 9 illustrates an internal view of an example weighing idler roller.

FIG. 9 illustrates a further example of a weighing idler roller 900 in which the roller shell is removed to illustrate the internal configuration of weighing idler roller 900. Static shaft 910 extends along the longitudinal length of weighing idler roller 900. An end of load cell 920 extends through and out of end plate 930. Load cells 920 are provided at both ends of weighing idler roller 900 and attach to the frame, or sub-frame, of a conveyer belt weighing system.

Figure 10:
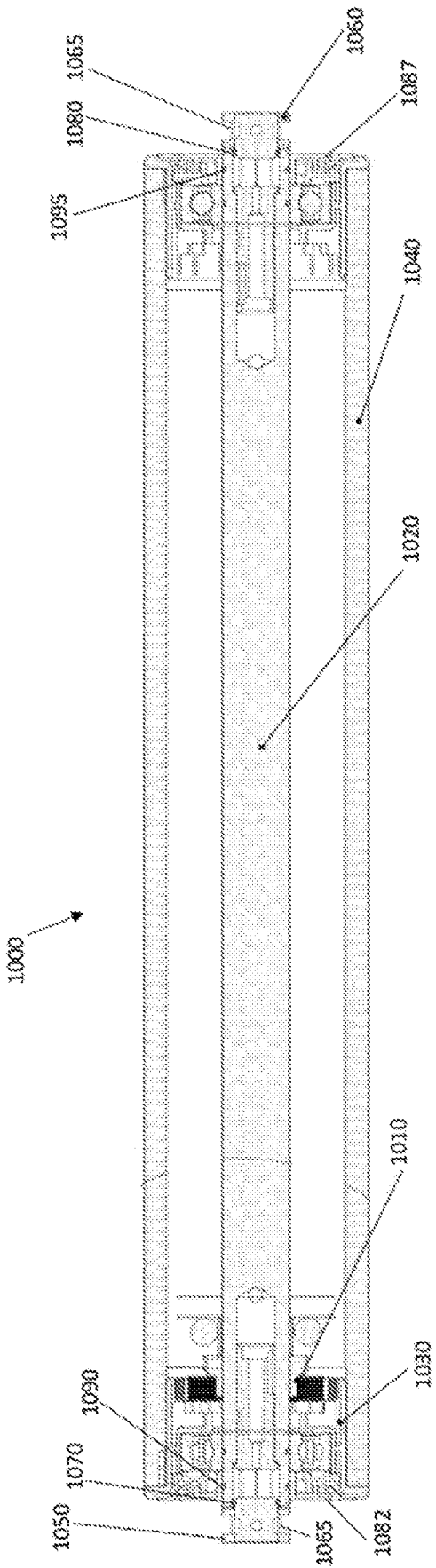
FIG. 10 illustrates a cross-sectional view of another example weighing idler roller.

FIG. 10 illustrates a further example of a weighing idler roller 1000. A longitudinal cross section plan view of weighing idler roller 1000 is illustrated and includes generator assembly 1010, shaft 1020, and bearing housing assembly 1030 which is provided at both ends of weighing idler roll 1000 and in one example may be made of a plastic or polymer material or materials. Weighing idler roller 1000 also includes roller shell 1040, for example being made of a plastic or polymer material or materials. First load cell 1050 is provided at one end of weighing idler roller 1000, and second load cell 1060 is provided at the opposite end of weighing idler roller 1000. First load cell 1050 and second load cell 1060 each include a shaft finger adapter 1065 at a distal end to facilitate attachment and fixing of weighing idler roller 1000 at both ends to a frame, or sub-frame, of a conveyer belt weighing system.

A first static seal 1070 is provided between an exterior surface of first load cell 1050 and an interior surface of a first end of static shaft 1020, and a second static seal 1080 is provided between an exterior surface of second load cell 1060 and an interior surface of a second end of static shaft 1020. The length and diameter of weighing idler roller 1000 can be varied depending on the application and physical dimensions of the conveyor belt weighing system.

In a non-limiting example, each end of weighing idler roller 1000 can be sealed with a labyrinth shaft seal that is provided abutting against the exterior surface of shaft 1020 and extending to bearing housing assembly 1030 provided at each end of weighing idler roller 1000. First labyrinth shaft seal 1082 and second labyrinth shaft seal 1087 provide end sealing arrangements for each end of weighing idler roller 1000. A first rotating shaft seal 1090 is positioned between a first labyrinth shaft seal 1082 and the exterior surface of shaft 1020. A second rotating shaft seal 1095 is positioned between a second labyrinth shaft seal 1087 and the exterior surface of shaft 1020.

Currently, the industry accepted belt sag is approximately 2% of the idler spacing. Industry accepted standards use a variety of design spacings depending upon belt loading and belt tension as required to achieve acceptable belt sag of approximately 2%. The spacing of idlers is generally for economical reasons, and often 1.5 m spacing is used to reduce the number of idlers required for conveyors carrying relatively light materials such as coal; and 1.0 m spacing is also often used for conveyors carrying heavy materials such as minerals.

In another example, material movement on a belt could be reduced by provision of a thicker belt. Thickness of belts varies between particular conveyor belt installations. Often, a 20 mm thickness is used for a 1.0 m wide belt, or a 35 mm thickness is used for a 2.0 m wide belt. By providing belts of relatively greater thickness less disturbance forces are transmitted to conveyed material at the idlers/rollers, which results in less material bounce and thus less relative material movement on the belt or other non-linear dynamic effects. Additionally or alternatively, the belt surface material and/or composition can be selected to assist in reducing material movement relative to the belt. By providing a belt surface or composition with a relatively greater than typical coefficient of friction the belt surface may better hold the conveyed material in position, thereby reducing material slip on the belt. Protruding structures from the surface of the belt, or indents into the surface of the belt, could be provided to reduce relative movement of the material to the belt surface.

Example Processing System

Figure 24:
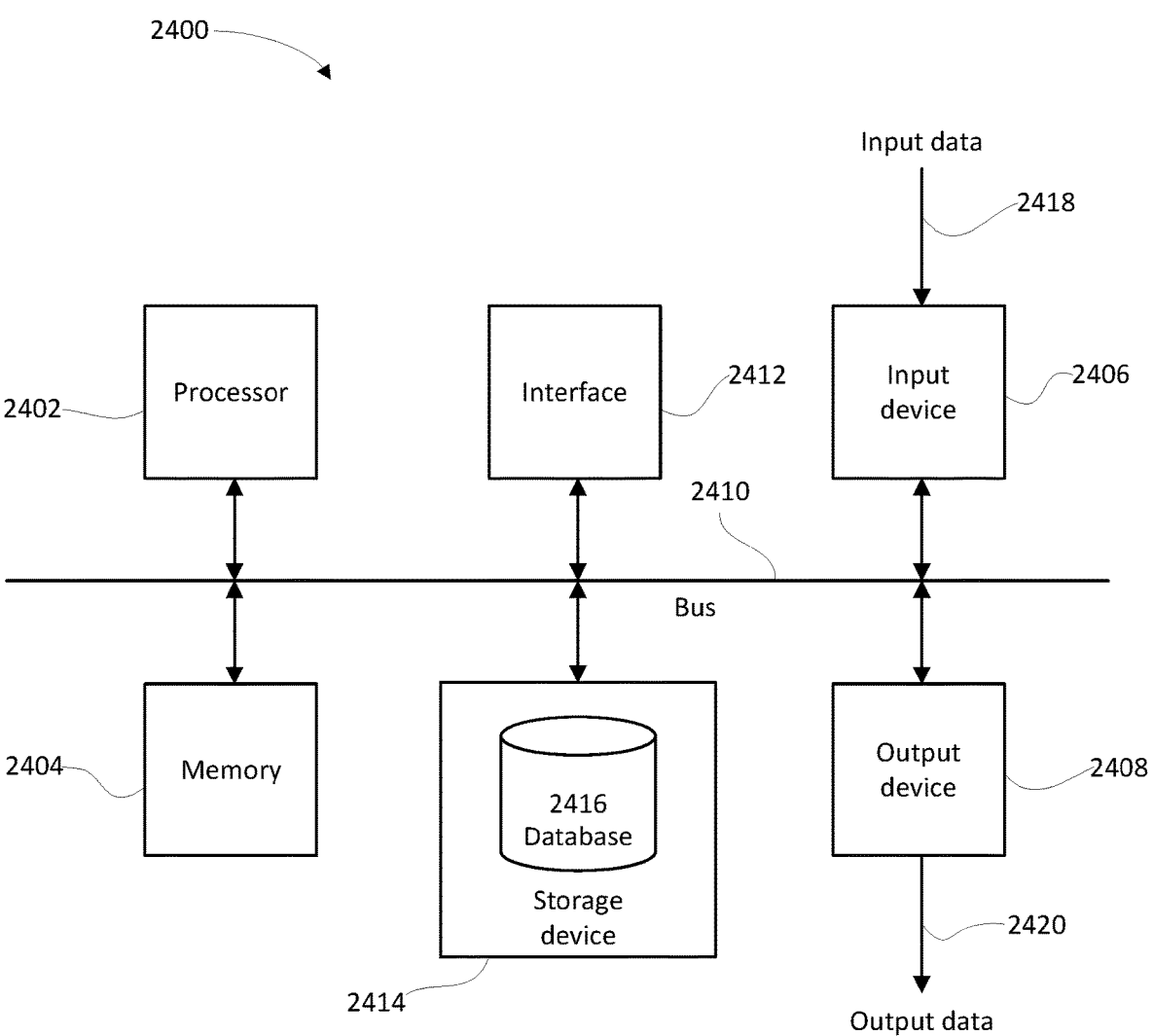
FIG. 24 illustrates a functional block diagram of an example processing system that can be utilised to embody or give effect to a particular embodiment.

A particular embodiment of the present invention can be realised using a processing system, an example of which is shown in FIG. 24. In particular, the processing system 2400 generally includes at least one processor 2402, or processing unit or plurality of processors, memory 2404, at least one input device 2406 and at least one output device 2408, coupled together via a bus or group of buses 2410. In certain embodiments, input device 2406 and output device 2408 could be the same device. An interface 2412 can also be provided for coupling the processing system 2400 to one or more peripheral devices, for example interface 2412 could be a PCI card or PC card. At least one storage device 2414 which houses at least one database 2416 can also be provided. The memory 2404 can be any form of memory device, for example, volatile or non-volatile memory, solid state storage devices, magnetic devices, etc. The processor 2402 could include more than one distinct processing device, for example to handle different functions within the processing system 2400.

Input device 2406 receives input data 2418 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 2418 could come from different sources, for example keyboard instructions in conjunction with data received via a network. Output device 2408 produces or generates output data 2420 and can include, for example, a display device or monitor in which case output data 2420 is visual, a printer in which case output data 2420 is printed, a port for example a USB port, a peripheral component adaptor, a data transmitter or antenna such as a modem or wireless network adaptor, etc. Output data 2420 could be distinct and derived from different output devices, for example a visual display on a monitor in conjunction with data transmitted to a network. A user could view data output, or an interpretation of the data output, on, for example, a monitor or using a printer. The storage device 2414 can be any form of data or information storage means, for example, volatile or non-volatile memory, solid state storage devices, magnetic devices, etc.

In use, the processing system 2400 is adapted to allow data or information to be stored in and/or retrieved from, via wired or wireless communication means, the at least one database 2416. The interface 2412 may allow wired and/or wireless communication between the processing unit 2402 and peripheral components that may serve a specialised purpose. The processor 2402 receives instructions as input data 2418 via input device 2406 and can display processed results or other output to a user by utilising output device 2408. More than one input device 2406 and/or output device 2408 can be provided. It should be appreciated that the processing system 2400 may be any form of terminal, server, specialised hardware, or the like.

Figure 25:
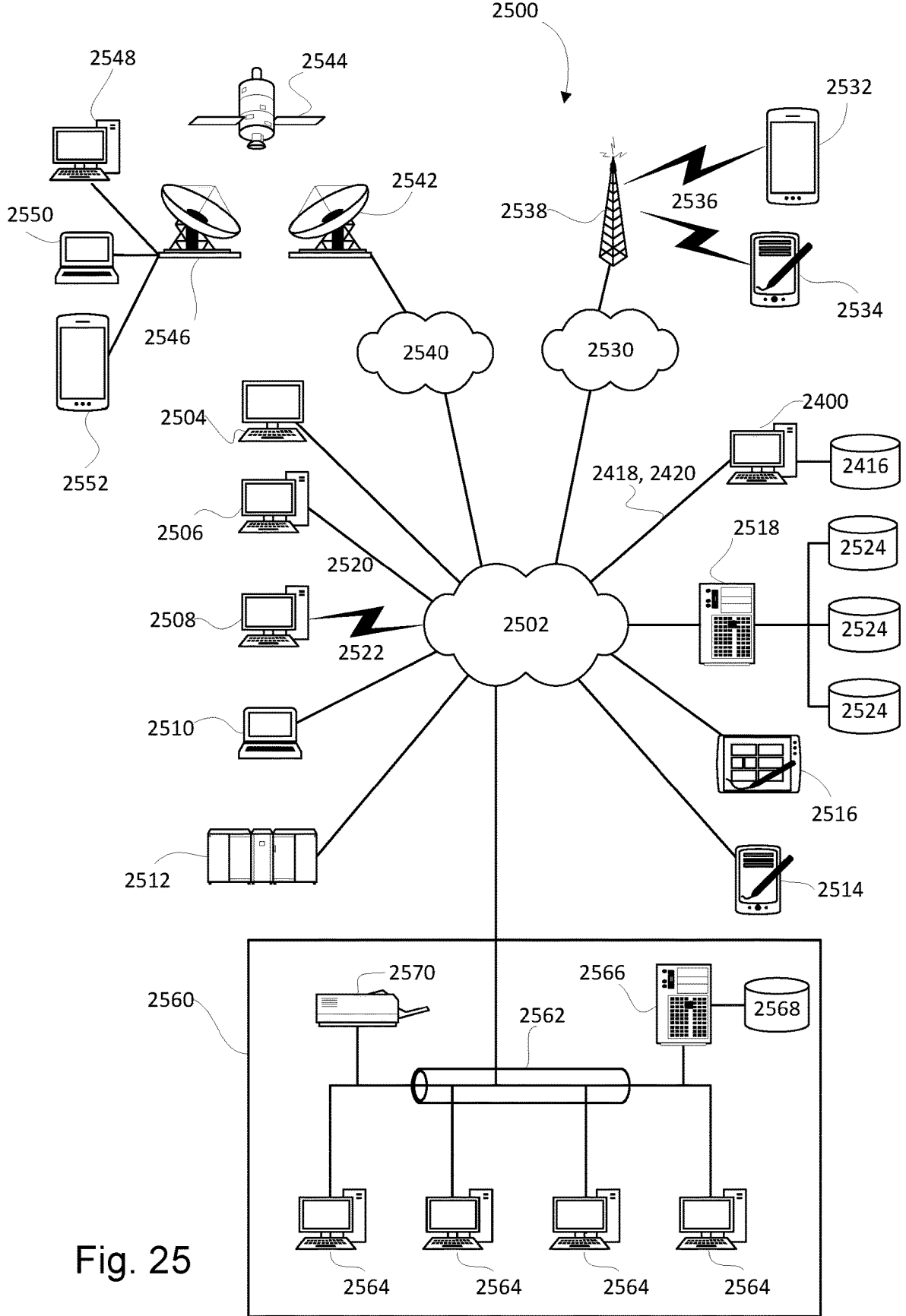
FIG. 25 illustrates an example network infrastructure that can be utilised to embody or give effect to a particular embodiment.

The processing system 2400 may be a part of a networked communications system 2500, as shown in FIG. 25. Processing system 2400 could connect to network 2502, for example the Internet or a WAN. Input data 2418 and output data 2420 could be communicated to other devices via network 2502. Other terminals, for example, thin client 2504, further processing systems 2506 and 2508, notebook computer 2510, mainframe computer 2512, PDA 2514, pen-based computer or tablet 2516, server 2518, etc., can be connected to network 2502. A large variety of other types of terminals or configurations could be utilised. The transfer of information and/or data over network 2502 can be achieved using wired communications means 2520 or wireless communications means 2522. Server 2518 can facilitate the transfer of data between network 2502 and one or more databases 2524. Server 2518 and one or more databases 2524 provide an example of an information source.

Other networks may communicate with network 2502. For example, telecommunications network 2530 could facilitate the transfer of data between network 2502 and mobile, cellular telephone or smartphone 2532 or a PDA-type device 2534, by utilising wireless communication means 2536 and receiving/transmitting station 2538. Satellite communications network 2540 could communicate with satellite signal receiver 2542 which receives data signals from satellite 2544 which in turn is in remote communication with satellite signal transmitter 2546. Terminals, for example further processing system 2548, notebook computer 2550 or satellite telephone 2552, can thereby communicate with network 2502. A local network 2560, which for example may be a private network, LAN, etc., may also be connected to network 2502. For example, network 2502 could be connected with ethernet 2562 which connects terminals 2564, server 2566 which controls the transfer of data to and/or from database 2568, and printer 2570. Various other types of networks could be utilised. The local network 2560 may be used to communicated between the conveyor belt weighing system, located at the conveyor belt and a display system used by an operator on the processing system 2400.

The processing system 2400 is adapted to communicate with other terminals, for example further processing systems 2506, 2508, by sending and receiving data, 2418, 2420, to and from the network 2502, thereby facilitating possible communication with other components of the networked communications system 2500.

Thus, for example, the networks 2502, 2530, 2540 may form part of, or be connected to, the Internet, in which case, the terminals 2506, 2512, 2518, for example, may be web servers, Internet terminals or the like. The networks 2502, 2530, 2540, 2560 may be or form part of other communication networks, such as LAN, WAN, ethernet, token ring, FDDI ring, star, etc., networks, or mobile telephone networks, such as GSM, CDMA, 4G, 5G etc., networks, and may be wholly or partially wired, including for example optical fibre, or wireless networks, depending on a particular implementation.

Example Monitoring System

Described below is a monitoring system for a belt weighing system, such as the conveyor belt weighing system 300 described above in relation to FIG. 3. The monitoring system may be displayed on a monitor of a computer or displayed on a tablet or mobile phone, such as the processing system 2400 described above.

Figure 11:
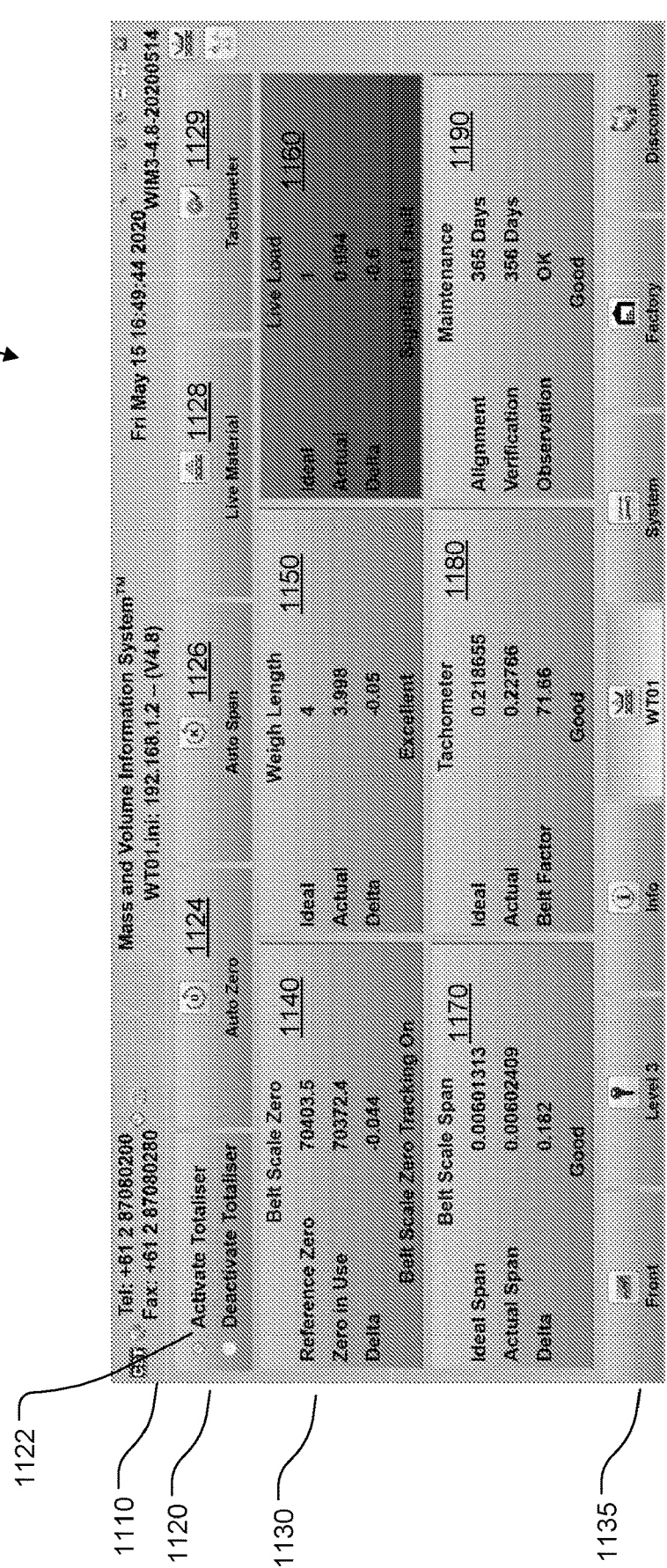
FIG. 11 illustrates an example status display for a monitoring system of a conveyor belt weighing system.

FIG. 11 shows a status page 1100 of a conveyor belt weighing system. The status page 1100 provides an operator with information about calibration of various sub-systems of the conveyor belt weighing system as well as the ability to select other displays and options for the system. The status page 1100 has four main display areas. The first display area is a heading area 1110 located at the top of the status page 1100. The heading area 1110 provides basic information such as a page title, IP address of a computer displaying the status page 1100, software version number for the monitoring system, support contact information, and time and date display.

A second display area of the status page 1100 is a control area 1120. The control area 1120 allows present buttons that the operator may select. A totaliser activity button 1122 allows a totaliser to be activated or deactivated. The totaliser measures a total of how much material has passed over the conveyor belt. When the totaliser is deactivated, the weight of material passing over the weighing system is not added to the total. When the totaliser is active, the weight of material passing over the weighing system is added to the total. The totaliser activity button 1122 also displays a status of the totaliser. When the totaliser is active, a deactivate totaliser radio button will be selected. If the totaliser is deactivated, an activate totaliser radio button will be selected. An Auto Zero button 1124 provides zeroing functionality that will be described below in relation for FIG. 12. An Auto Span button 1126 will execute an auto span calculation by the processing system 2400 to determine an actual span value as displayed at a belt scale span display 1170. A Live Material button 1128 may select a display with information about operation of the conveyor belt weighing system. Finally, a tachometer button 1129 may be used to enable or disable tachometer operation of the conveyor belt weighing system.

A third display area of the status page 1100 is a status display area 1130 where status information for sub-systems of the conveyor belt weighing system are displayed. The status display area 1130 is divided into six sub-system: belt scale zero display 1140, weigh length display 1150, live load display 1150, belt scale span display 1170, tachometer display 1180 and maintenance display 1190.

The belt scale zero display 1140 shows a reference zero value which is a reference value for the belt scale zero used as a standard. A reference value is an ideal value for a calibration value and may also be referred to as a reference calibration value, a standard value or a reference standard value. The reference value is checked approximately every year and the value displayed may be updated. The actual belt scale zero in use by the conveyor belt weighing system is displayed as the zero in use value. The zero in use value is a calibration value for the monitoring system and may be compared to the reference value as a means to assess accuracy for the calibration value. If the calibration value deviates too far from the reference value, then the conveyor belt weighing system may not be accurate. To assist the operator in understanding the difference between the two values, a delta value is displayed. The delta value represent a difference between the reference value, reference zero, and the calibration value, the zero in use value, expressed as a percentage. As with the other delta values that will be discussed, the delta value is typically displayed as a percentage value. However other display types may also be used, such as a difference between the two values, an absolute difference between the values or an absolute percentage difference. Finally a belt scale zero tracking status display may show a value or "on" or "off". When the belt scale zero tracking is enabled, in the "on" state, the monitoring system may monitor the delta value for the belt scale zero.

If the delta value exceeds a predetermined threshold, then the monitoring system may raise an alarm and a colour of the belt scale zero display 1140 may change. When the delta value is within a healthy range, then the belt scale zero display 1140 may display green. Once the delta value exceeds the predetermined range then the belt scale zero display 1140 may change colour to indicate a fault, for example the colour may change to red. The belt scale zero display 1140 may also display a warning colour of amber for a predetermined range of delta values, between the healthy and faulty range. The belt scale zero display 1140 may also be configured as a button which, when pressed may take the user to an auto zero calibration page 1120 where a zero trend and action buttons are displayed.

The weigh length display 1150 operates in a similar manner to the belt scale zero display 1140 described above. The weigh length display 1150 displays a reference value for a weigh length as an ideal value, shown with a value of 4. The ideal value represents a sensitivity of the weigh frame. The ideal value is a number of idler spacing multiplied by a number of no idlers. The weigh length in use by the system, the calibration value for the weigh length, is displayed as actual value, shown as 3.998. A delta value shows a difference between the ideal value and the actual value as a percentage and is a comparison value between the reference value and the calibration value. The delta value is a percentage difference between the reference value and the calibrated value. Finally, a status of the weigh length is displayed at the bottom of the weigh length display 1150. The status displayed is "Excellent". The display value may be selected from status messages including "Excellent", "Good", "Fair", "Poor", "Faulty" or "Significant Fault". Along with changing the status message, the delta value may change colour of the weigh length display 1150 of the status page 1100. For example, "Excellent, "Good" and Fair" may be green, "Poor" may be amber, "Faulty" may be red while "Significant Fault" may be a flashing red. The weigh length display 1150 may be configured as a button and pressing the display may take the user to a weigh length calibration measurement page.

The live load display 1160 operates in a similar manner to the previously described belt scale zero display 1140 and the weigh length display 1150. The live load display 1160 shows a standard as ideal which is typically set to 1.0. The operational value, or calibration value, of the live load is displayed as actual value, shown as 0.994. Deviation of the actual from the ideal is displayed as delta, which is a comparison value and may be represented as a percentage difference of the actual value from the ideal value and is shown as −0.6. A status is displayed at the bottom of the live load display 1160 and is shown as "Significant Fault". The status may be selected using the delta value. Alternative status messages may include "Excellent", "Good", "Fair", "Poor" or "Faulty". Along with changing the status message, the delta value may change colour of the live load display 1160 of the status page 1100. For example, "Excellent, "Good" and Fair" may be green, "Poor" may be amber, "Faulty" may be red while "Significant Fault" may be a flashing red. Pressing the live load display 1160 takes the user to a live load setup and calibration page.

The belt scale span display 1170 operates in a similar manner to the live load display 1160, belt scale zero display 1140 and the weigh length display 1150. A reference value for a belt scale span is displayed as an ideal span value, shown with a value of 0.00601313. The ideal span value is based on a factory calibration of the load cells used in the conveyor belt weighing system. The calibration value of the belt scale span is displayed as an actual span value, showing a value of 0.00602409. A comparison value is shown as a delta value. The delta value is determined as a difference between the actual span and the ideal span values and is displayed as a percentage of the actual span. As with other delta values, the use of a percentage allows easy comparison between small values, such as the values of the belt scale span. A status is displayed at the bottom of the belt scale span display 1170 and is shown as "Good". The display value may be selected from status messages including "Excellent", "Good", "Fair", "Poor", "Faulty" or "Significant Fault". Along with changing the status message, the delta value may be used to change colour of the belt scale span display 1170 of the status page 1100. For example, "Excellent, "Good" and Fair" may be green, "Poor" may be amber, "Faulty" may be red while "Significant Fault" may be a flashing red. The belt scale span display 1170 may be configured as a button and pressing the display may take the user to a span functions and a trade graph display.

The tachometer display 1180 operates in a similar manner to the belt scale span display 1170, the live load display 1160, the belt scale zero display 1140 and the weigh length display 1150. A reference value for a tachometer is displayed as an ideal value, shown with a value of 0.218655. There is no actual predetermined value for the ideal value, however, the values are limited by the physical arrangement of the tachometer and the conveyor belt. As such, the ideal value should be such that the tachometer should turn at a radius inside the belt. One option, when determining the ideal value, is to select a recently used calibration value for the tachometer and set the recent value as the ideal value. The recent value may be used when it is not possible to calculating a turning radius and validating that the turning radius is inside the belt. Recent values may be stored as candidate ideal values in the monitoring system. Storing a recent value as candidate value may require an elevated access level of the operator to ensure that skilled operators select suitable candidate values. A calibration value for the tachometer is displayed as actual, showing a value of 0.22766.

The belt factor will now be explained. If there is pure tangential contact between a pulley and the belt, a radius of turning will be at the edge of the belt, at the outer surface of the pulley. For greater angles of wrap of the conveyor belt, the radius of turning will occur inside the conveyor belt due to the elasticity of the conveyor belt. The radius of turning must be inside the belt to be a valid value. Radiuses of turning outside the belt are considered as errors. A location inside the belt is expressed as a percentage of the belt thickness. A belt factor between 0% and 100% is admissible while a negative belt factor or a belt factor greater than 100% may be an error.

A status displayed at a bottom of the tachometer display 1180 is determined from the belt factor and is shown as "Good". The status display value may be selected from status messages including "Excellent", "Good", "Fair", "Poor", "Faulty" or "Significant Fault". Along with changing the status message, the belt factor may be used to change colour of the tachometer display 1180 of the status page 1100. For example, "Excellent, "Good" and Fair" may be green, "Poor" may be amber, "Faulty" may be red while "Significant Fault" may be a flashing red. The tachometer display 1180 may be configured as a button and pressing the display may take the user to tachometer calibration and setup pages.

The maintenance display 1190 operates in a similar manner to the tachometer display 1180, the belt scale span display 1170, the live load display 1160, the belt scale zero display 1140 and the weigh length display 1150. The maintenance display 1190 shows times for maintenance operation of the conveyor belt weighing system. An alignment value, shown as 365 days may show a number of days until an alignment maintenance task is to be performed. A verification value, shown as 356 days, may show a number of days until a verification maintenance task is to be performed. An observation value may show the last status of a visual inspection. A status display at the bottom of the maintenance display 1190 may be determined from the alignment, verification and observation values. If any of these values are faulty, such as alignment having a negative days value, then the status of the maintenance display 1190 may display the value faulty. The status display value may be selected from status messages including "Excellent", "Good", "Fair", "Poor", "Faulty" or "Significant Fault". Along with changing the status message, the alignment, verification and observation values may be used to change colour of the maintenance display 1190 of the status page 1100. For example, "Excellent, "Good" and Fair" may be green, "Poor" may be amber, "Faulty" may be red while "Significant Fault" may be a flashing red. The maintenance display 1190 may be configured as a button and pressing the display may take the user to maintenance setup page.

A fourth and final display area of the status page 1100 is a menu area 1135 where a user of the monitoring system may select other pages to display. For example, the user may select more information about the monitoring system by selecting the info button or disconnect the monitoring system from a conveyor belt weighing system by pressing disconnect. A confirmation dialog may be used to ensure that the monitoring system is not accidentally disconnected.

Figure 12:
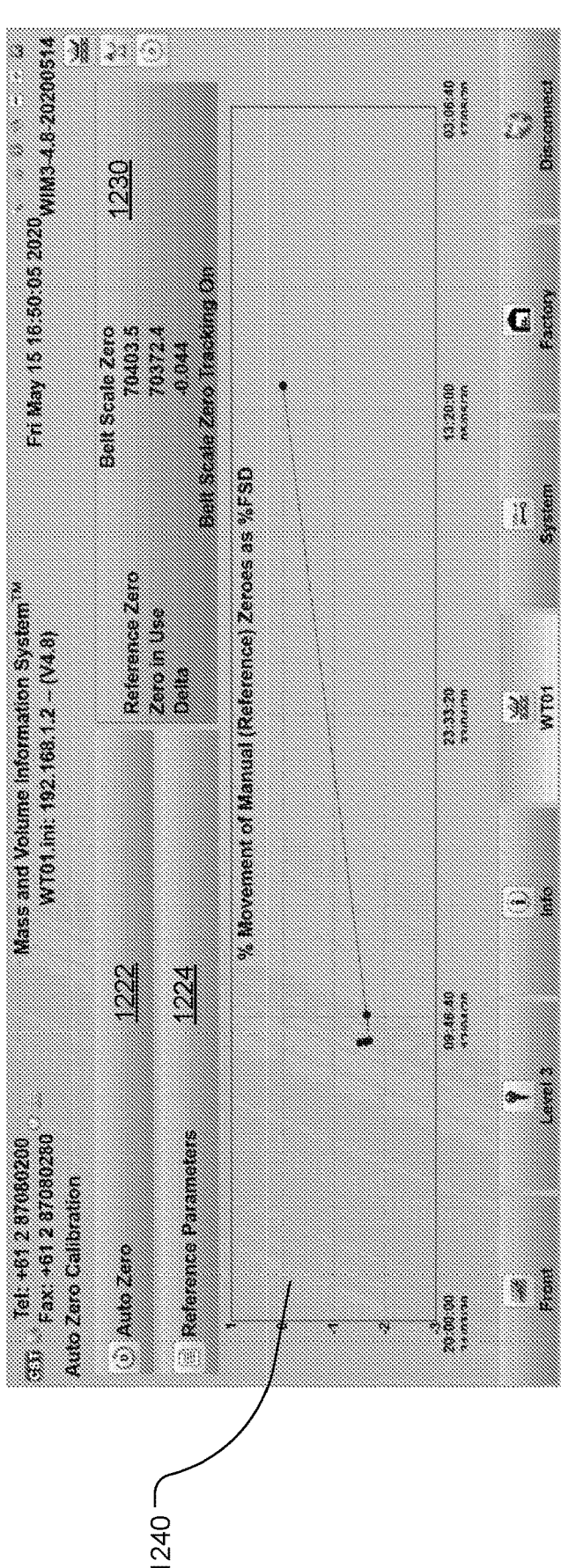
FIG. 12 illustrates an example auto zero calibration display for the monitoring systems of the conveyor belt weighing system.

FIG. 12 shows the auto zero calibration page 1200 with heading areas and menu areas identical to corresponding areas of the status page 1100. The auto zero calibration page 1120 contains an Auto Zero button 1222 which, when pressed, determines a new value for belt scale zero to be used by the monitoring system. The belt scale zero may be determined when the conveyor belt is in operation, but no material is passing over the conveyor belt weighing system. When Auto Zero button 1222 is pressed a new value may be measured. A reference parameters button 1224 may be used by the operator to display a new page with information regarding the conveyor belt weighing system. A belt scale zero display 1230 shows information, as described above in relation to the belt scale zero display 1140 of FIG. 11. However, the belt scale zero display 1230 does not operate as a button when selected by an operator.

A chart area 1240 may show a change, over time, on the delta value displayed on the belt scale zero display 1230. The use of such a chart may allow an operator to monitor a rate of change of the delta value, determine a trend of the delta value and may be of assistance in detecting errors that may appear in the conveyor belt weighing system.

Figure 13:
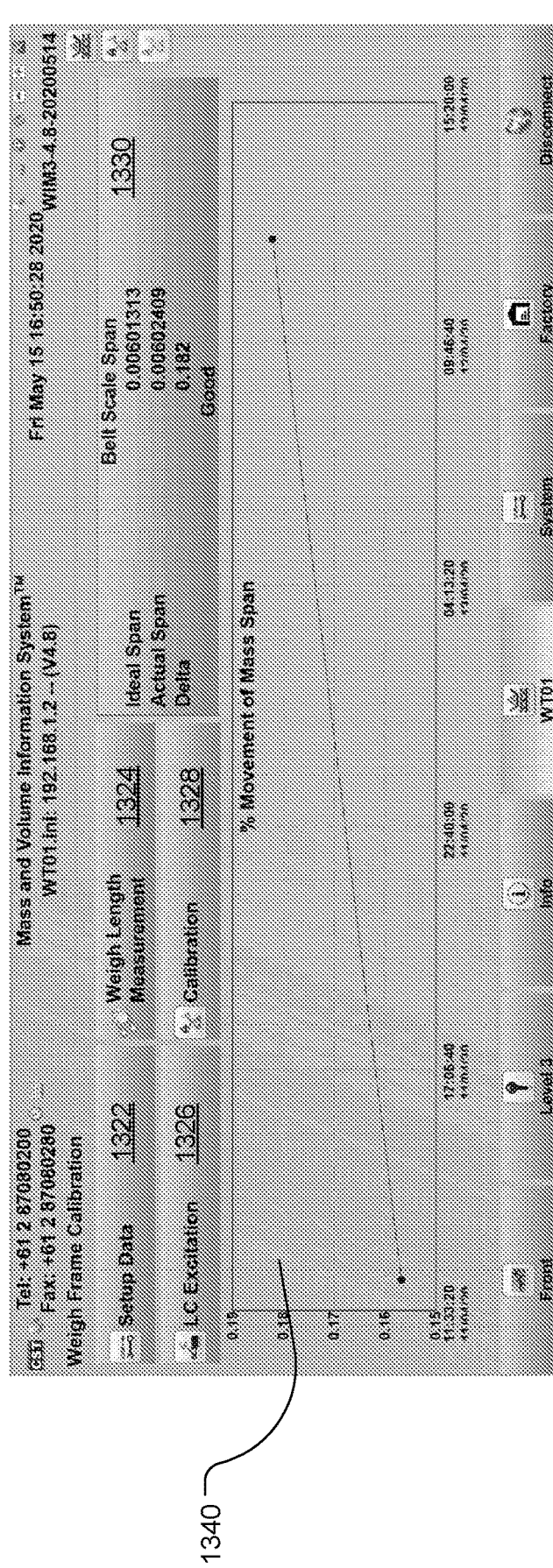
FIG. 13 illustrates an example weigh frame calibration display for the monitoring systems of the conveyor belt weighing system.

FIG. 13 shows a weigh frame calibration page 1300 with heading areas and menu areas identical to corresponding areas of the status page 1100. The weigh frame calibration page 1300 has a setup data button 1322, a weigh length measurement button 1324, a LC excitation button 1326 and a calibration button 1328. When an operator presses the weigh length measurement button 1324 the monitoring system configures the conveyor belt weighing system to allow determination of the weigh length. The belt scale span display 1330 displays information as described above in relation to the belt scale span display 1170 of FIG. 11, however the belt scale scan display 1330 does not operate as a button when selected by an operator.

A chart area 1340 may show a change, over time, of the delta value displayed in the belt scale span display 1330. The use of such a chart may allow an operator to monitor a rate of change of the delta value, determine a trend of the delta value and may be of assistance in detecting errors that may appear in the conveyor belt weighing system.

Figure 14:
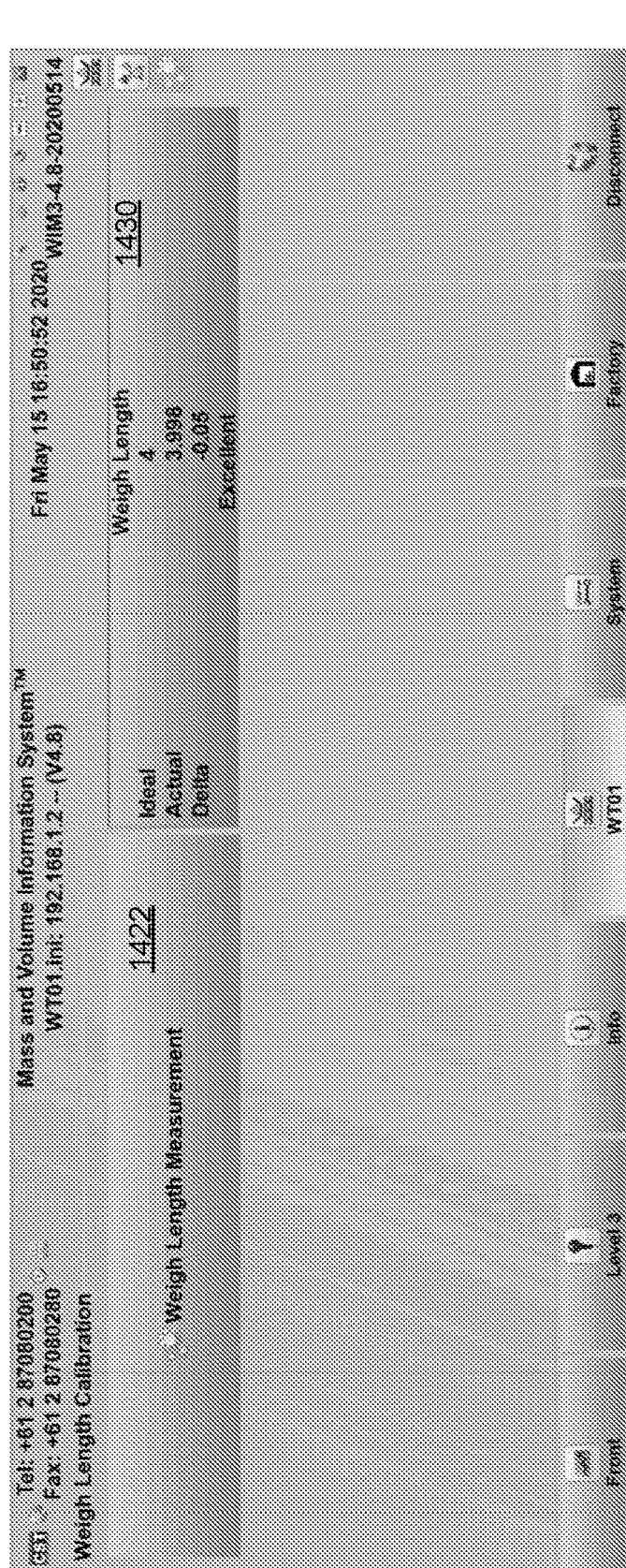
FIG. 14 illustrates an example weigh length calibration display for the monitoring systems of the conveyor belt weighing system.

FIG. 14 shows a weigh length calibration page 1400 with heading areas and menu areas identical to corresponding areas of the status page 1100. The weigh length calibration page 1400 has a weigh length measurement button 1422 which may allow an operator to enter a value for the weigh length. The weigh length display 1430 shows information as described above in relation to the weigh length display 1150 of FIG. 11, however the weight length display 1430 does not operate as a button when selected by an operator.

Figure 15:
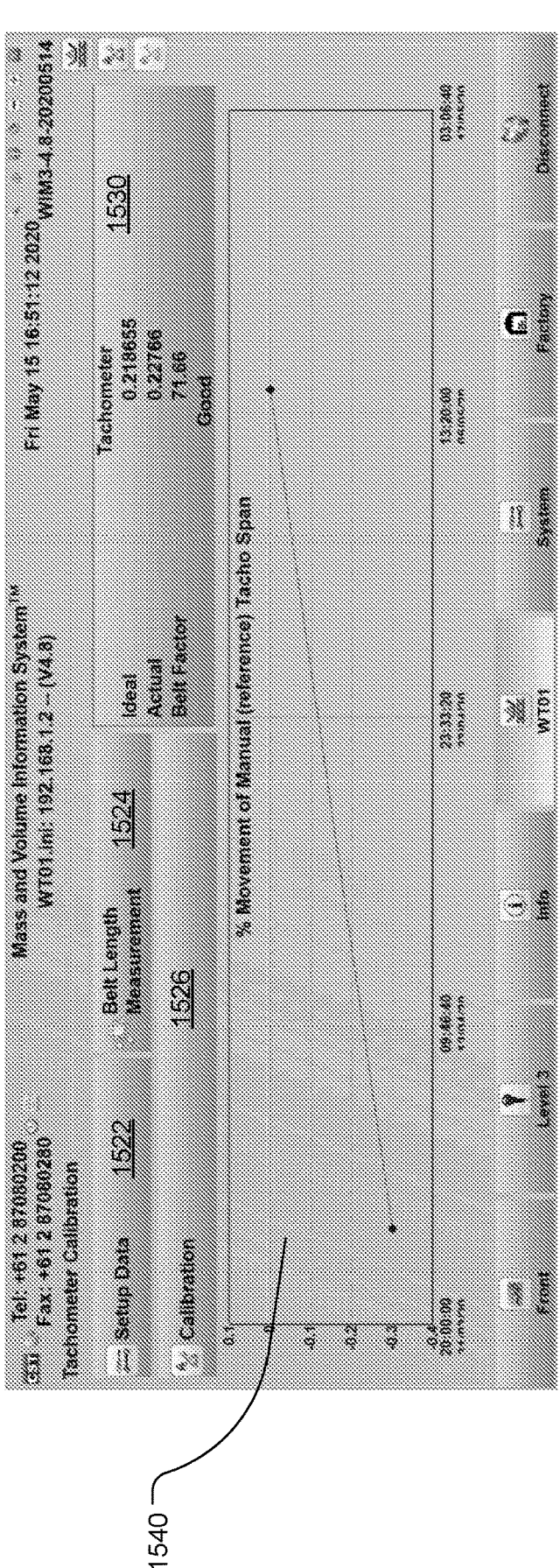
FIG. 15 illustrates an example tachometer calibration display for the monitoring systems of the conveyor belt weighing system.

FIG. 15 shows a tachometer calibration page 1500 with heading areas and menu areas identical to corresponding areas of the status page 1100. The tachometer calibration page 1500 may have a setup data button 1522, a belt length measurement button 1524 and a calibration button 1526. The belt length measurement button 1524 maybe used by the operator to enter a belt length value manually. The calibration button 1526 may be used to calibrate the tachometer. The tachometer display 1530 shows information as described above in relation to the tachometer display 1180 of FIG. 11, however the weight length display 1530 does not operate as a button when selected by an operator.

A chart area 1540 may show a change in a tacho span value. The use of such a chart may allow an operator to monitor a rate of change of the tacho span, determine a trend for the tacho span and may be of assistance in detecting errors that may appear in the conveyor belt weighing system. Alternatively, the chart area 1540 may show a change in the belt factor displayed in the tachometer display 1530 over time. The use of such a chart may allow an operator to monitor a rate of change of the belt factor, determined a trend of the belt factor and may be of assistance in detecting errors that may appear in the conveyor belt weighing system.

Figure 16:
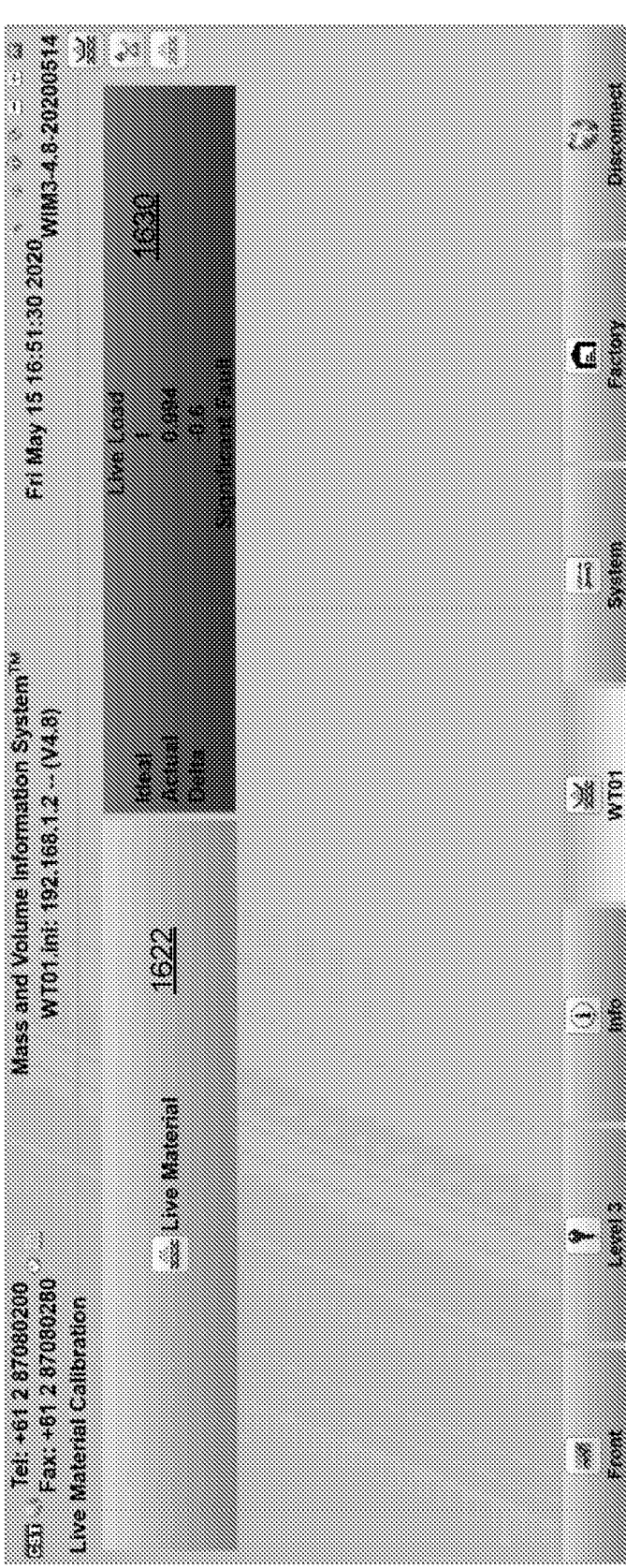
FIG. 16 illustrates an example live material calibration display for the monitoring systems of the conveyor belt weighing system.

FIG. 16 shows a live material calibration page 1600 with heading areas and menu areas identical to corresponding areas of the status page 1100. The live material calibration page 1600 has a Live Material button 1622. A Live Material display 1630 displays information as described above in relation to the live load display 1150 of FIG. 11, however the Live Material display 1630 does not operate as a button when selected by an operator.

Figure 17:
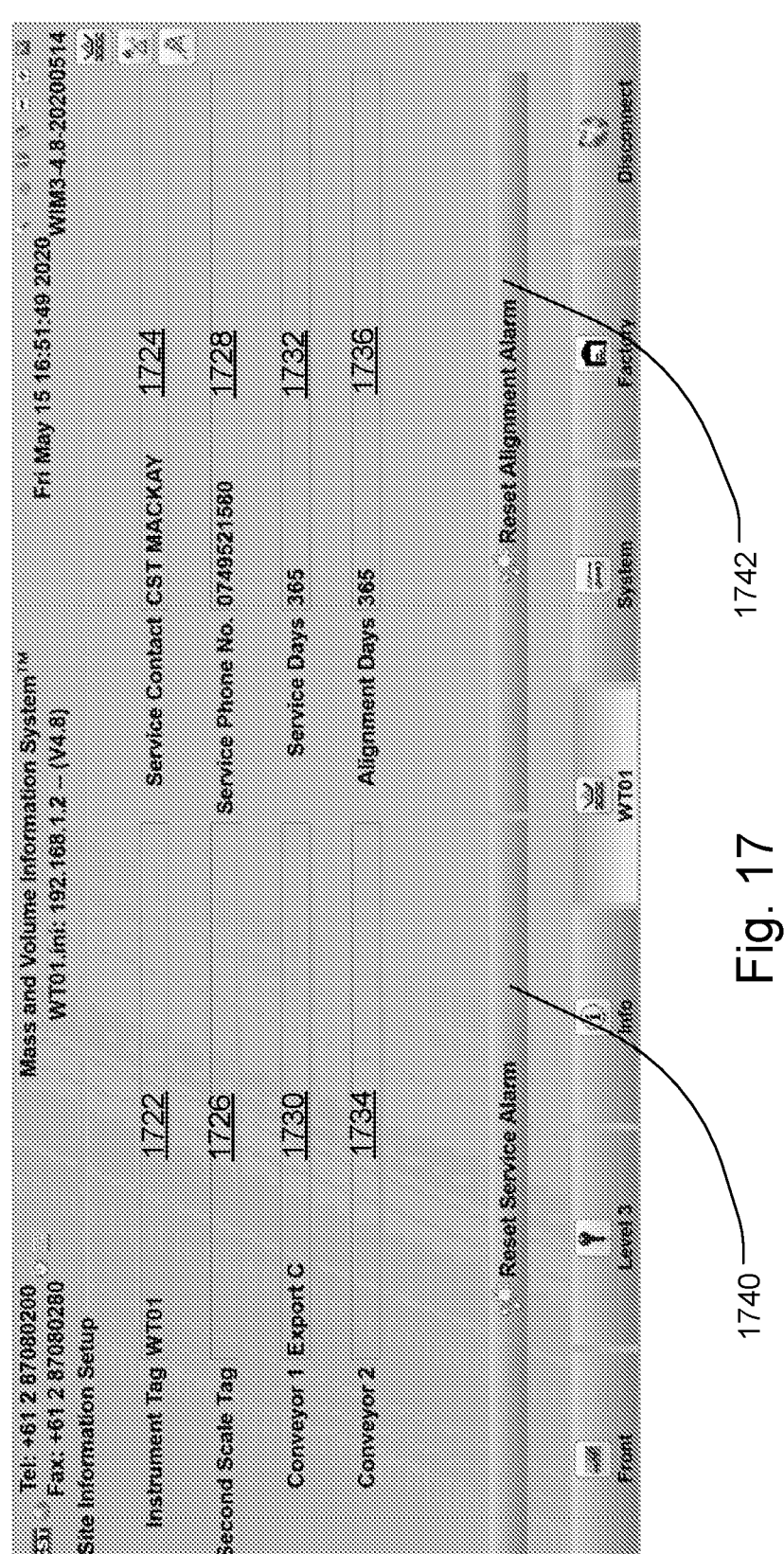
FIG. 17 illustrates an example site information setup display for the monitoring systems of the conveyor belt weighing system.

FIG. 17 shows a site information setup page 1700 with heading areas and menu areas identical to corresponding areas of the status page 1100. The site information setup page 1700 displays an instrument tag 1722, service contact 1724, a second scale tag 1726, a service phone number 1728 and conveyor information fields 1730 and 1734. Service days 1732 and alignment days 1736 are also displayed and the alignment days 1736 may be a duplicate of the corresponding alignment days value on the maintenance display 1190. A reset service alarm button 1740 may be selected by the operator and may silence or snooze a service day alarm. The service day alarm may be triggered once the service days has counted down to 0, if operating as a countdown timer. The reset service alarm button 1740 may also operate to reset the service day counter. A reset alignment alarm button 1742 may operate in a similar manner to the reset service alarm button 1740. The reset alignment alarm button 1742 may be selected by the operator and may silence or snooze an alignment alarm. The alignment alarm may be triggered once the alignment days has counted down to zero, if operating as a countdown timer. The reset alignment alarm button 1742 may also operate to reset the alignment day counter.

Figure 18:
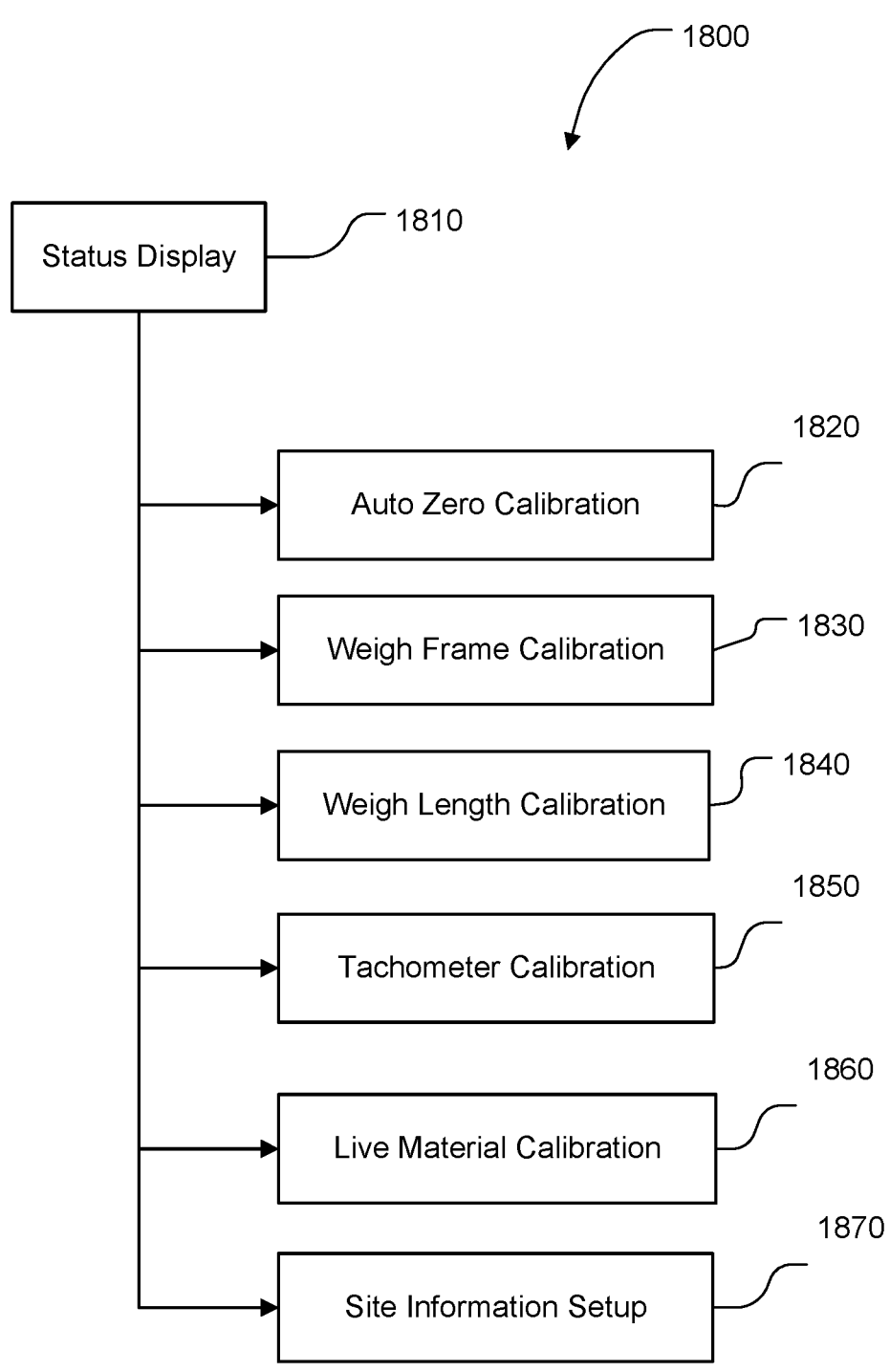
FIG. 18 illustrates an example navigation flow of displays for the monitoring systems of the conveyor belt weighing system.

FIG. 18 shows an example of how the pages described above in relation to FIGS. 11 to 17 may be linked together. Status display page 1810 may be a parent page with an auto zero calibration page 1820, a weigh frame calibration page

1830, a weigh length calibration page 1840, a tachometer calibration page 1850, a live material calibration page 1860 and a site information setup page 1870 linked from the parent page.

Figure 19:
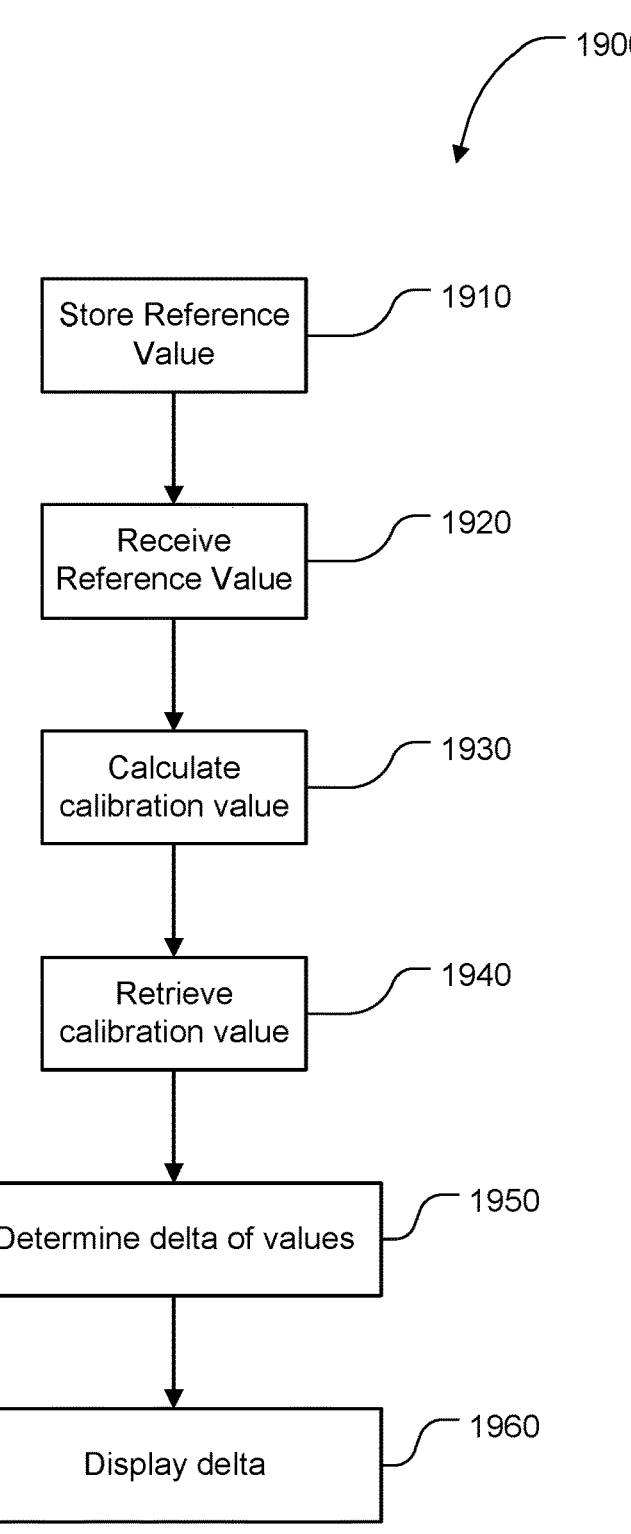
FIG. 19 is an example flow chart of a method of determining a change from a reference value for the monitoring systems of the conveyor belt weighing system.

FIG. 19 illustrates a method 1900 of determining a change from a reference value which may be executed on the processing system 2400. The method 1900 may be used to determine a delta value such as the delta value shown on the belt scale zero display 1140, the weigh length display 1150, the live load display 1160, and the belt scale span display 1170. The method 1900 determines a difference between the reference value and the calibration value used to operate the conveyor belt weighing system. The determined difference, or comparison value, may be displayed to an operator of the conveyor belt weighing system and allows the operator to gauge a difference between the calibration value in use and a reference value. Such a difference allows a low skilled operator to have a single number that may indicate a source of error for the conveyor belt weighing system.

The method 1900 starts with a storing step 1910 where the reference value is stored in the monitoring system for later use. The reference value may be determined using an automated calibration system or entered into the system from a manual calibration. The storing step 1910 may be performed whenever the reference value is updated and may be performed many months prior to a receiving reference value step 1920.

In the receiving reference value step 1920 the reference value stored in the monitoring system is retrieved. Next, a calculation step 1930 may be performed. The calculation step 1930 may determine a calibration value for the monitoring system. Examples of such a calibration value are the zero in use of the belt scale zero 1140, the actual value of the weigh lengths display 1150, the actual value of the live load display 1160, the actual span value of the belt scale span display 1170 and the actual value of the tachometer display 1180. Such values may be referred to as calibration values.

Next, a receive calibration value step 1940 gets the calibration value stored at calculation step 1930. The calculation step 1930 may also provide the calibration value and the receive calibration value step 1940 may be skipped. The calibration value and the reference value are used to determine a comparison, or delta, value in a determination step 1950. As described above, the delta value may be determined as a difference between the reference value and the calibration value, expressed as a percentage of the reference value. As also described above, other techniques may be used to determine a suitable value for display to the operator. The goal of the determination step 1950 is to produce a value that shows how much difference there is between the reference value and the calibration value.

The final step is a display step 1960 where the delta value determined at step 1950 is displayed to the operator on the monitoring system. Although the delta value is shown as a numeric display, other displays may also be used. A chart or some other type of graphical representation may also be used, such as a dial. A combination of numerical display and graphical display may also be used.

An alternative embodiment will now be described in relation to FIGS. 20 to 23 and is directed to an automated testing system for the conveyor belt weighing system. The automated testing system may be started from a test page which may be accessed by the automated testing system operator to facilitate testing before an important transaction such as loading a ship. The automated testing system may be executed on processing system such as a computer, laptop, tablet or mobile phone and operate in a similar manner as the processing system 2400 described above.

The automated testing system may check calibration values for the conveyor belt weighing system and automatically produce a summary page of result as well as storing or emailing the result. Selection of the automated testing system option may appear if the conveyor belt is running empty and security access level is equal to zero, a minimum security level.

Figure 23:
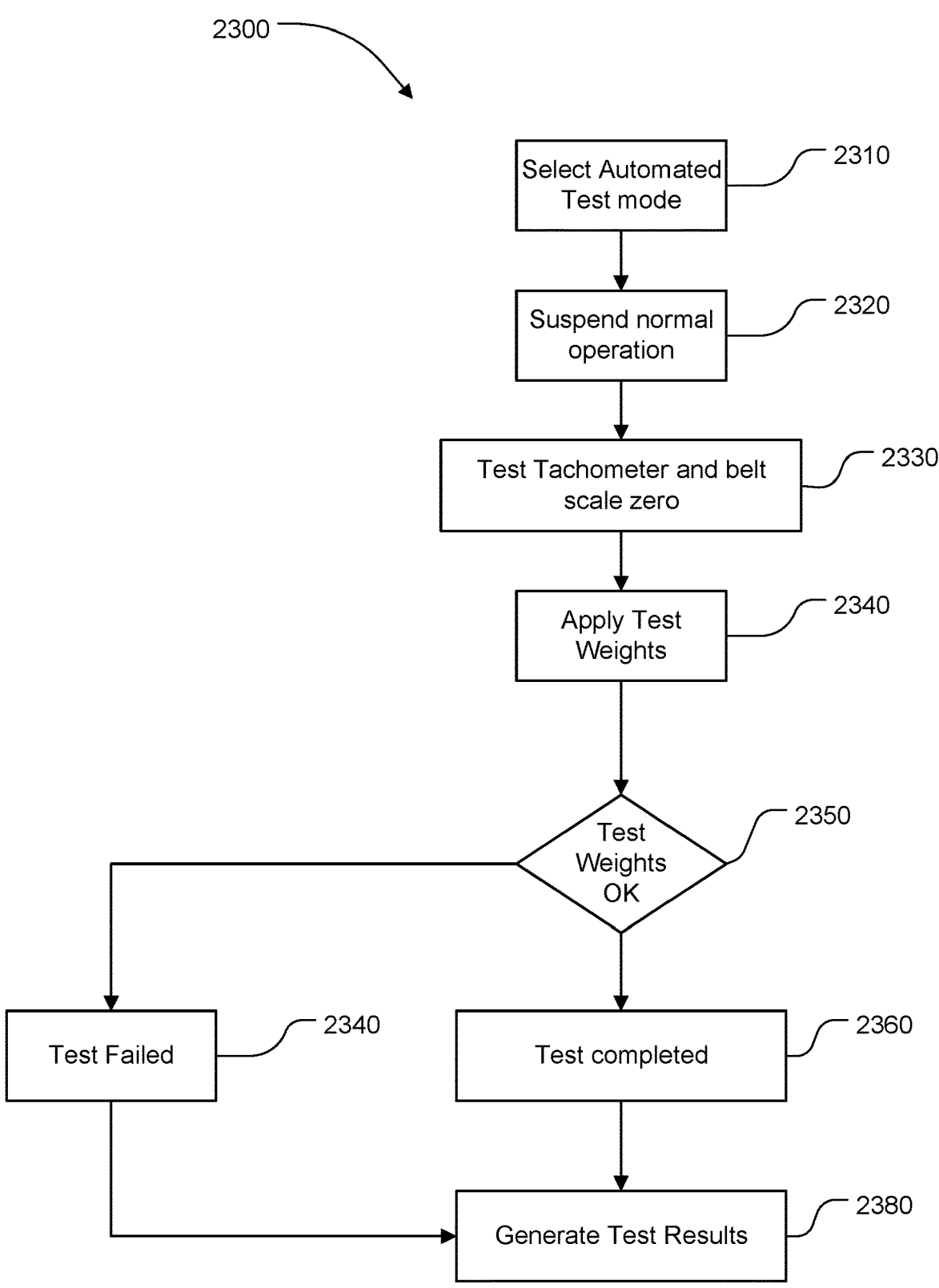
FIG. 23 is an example flow chart of a method of automated testing for the automated testing system.

FIG. 23 shows an automated testing method 2300. The method 2300 starts with a test mode selection step 2310 where an operator selects an automated testing mode on an automated testing system page. Selection of the automated testing mode may be locked out unless an operator enters a password or the conveyor belt is operating in a predetermined state, such as without material on the conveyor belt.

In response to selecting the automated test mode the method 2300 moves to a suspend normal operation step 2320. When the automated test mode is selected, normal operation of the conveyor belt is suspended as material on the conveyor belt may not be counted and may not be added to the totaliser. A flashing warning bar may be displayed at a top of the automated testing page to indicate to the operator that the automated testing system is active and normal operation of the conveyor belt has been suspended.

Testing of the tachometer and belt scale zero take place at testing step 2330 where the tachometer and belt scale zero are automatically tested. The tachometer is tested using a mark on the conveyor belt paired with two sensors capable of detecting the mark. The sensors are placed at known locations along the conveyor belt with a known distance between the two sensors. The tachometer is used to measure distance between the two sensors as the mark on the conveyor belt travels from a first of the two sensors to a second of the two sensor. The tachometer measurement may then be compared to the known distance between the first and second sensor.

The belt scale zero test proceeds over a predetermined belt length and may use the marker and the sensor used for the tachometer testing. The belt scale zero test is conducted with no material on the conveyor belt. As there is no material on the conveyor belt, the expected flow rate is zero. An expected value may be compared to a reading from the conveyor belt weighing system. If the reading is within a predetermined threshold of the expected value then the belt scale zero test will pass.

Next, a weights test step 2340 is carried out to test weighing accuracy of the conveyor belt weighing system. Test weights may be placed on the conveyor belt to test accuracy of the conveyor belt weighing system. The test weights have a predetermined mass that is configured within the automated calibration system. The automated calibration system may expect to see selected test weights used. For example, a test may use test weight 1, test weights 1 and 2 or test weights 1, 2 and 3 if there are three test weights entered into the automated calibration system.

A weight check step 2350 checks to see if the weigh reading from the conveyor belt weighing system is within an acceptable range. The range for the test weights may be plus or minus 30% of an individual test weight. Alternatively range maybe plus or minus 10% of an individual test weights. Alternatively the range may be accumulated over two or more, or all of the selected test weights.

If a weight reading is recorded by the conveyor belt weighing system outside the acceptable range then the method 2300 proceeds to a test fail step 2370. At test fail step 2370 the failure of the test is recorded, an alarm may be generated and the test may be stopped. The totaliser may return to normal operation.

If the weight reading is recorded by the conveyor belt weighing system within the acceptable range then the method 2300 proceeds to a test completed step 2360 where result from the test are recorded.

The method 2300 concludes with a generate test results step 2380 where the results from the tachometer, belt scale zero and weight test are prepared and presented to the operator. The results may also be stored for later use or emailed to selected recipients. The test mode is disabled and normal operation of the conveyor belt weighing system resumes.

Example Automated Testing System

Figure 20:
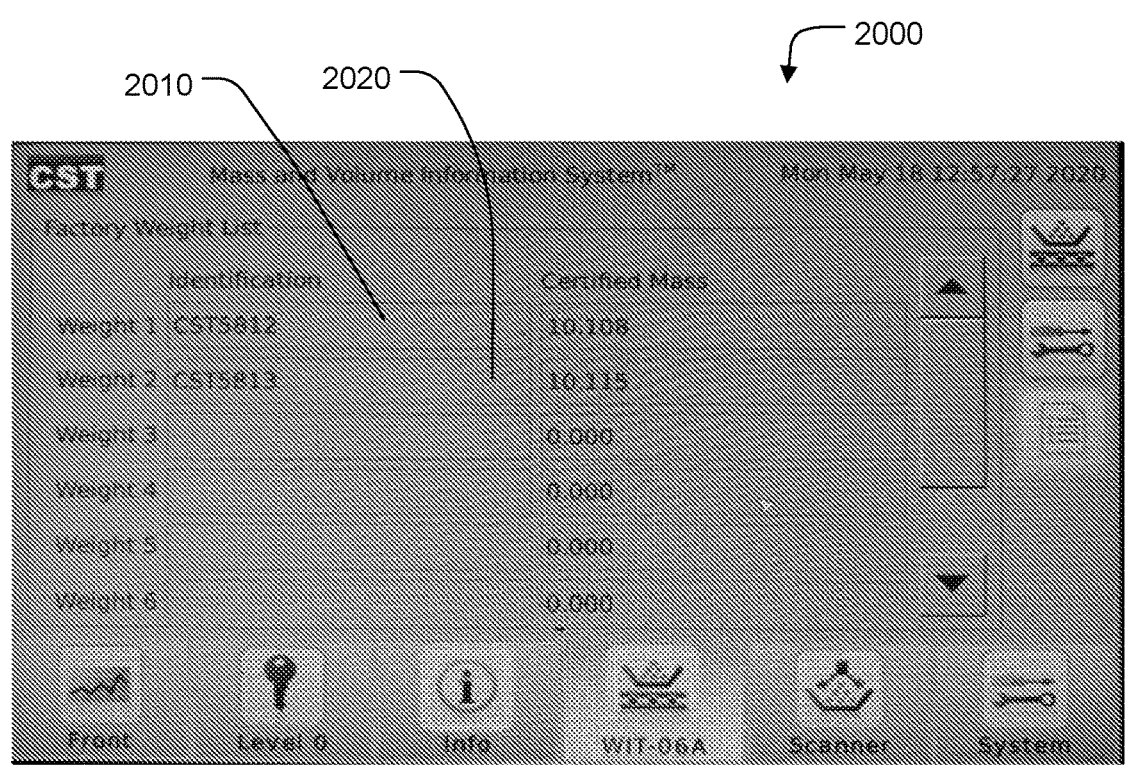
FIG. 20 illustrates an example factory weight list page for an automated testing system.

An automated testing system and display screen and an automated testing method 2300 will now be described with reference to FIGS. 20 to 22. FIG. 20 shows a factory weight list page 2000 with a listing of test weights. Weight 1 2010 is listed with an identification tag that can be found on the weight and a certified mass value of 10.108 kg. Weight 2 is also listed with an identification tag value and shown as having a certified mass of 10.115 kg.

Figure 21:
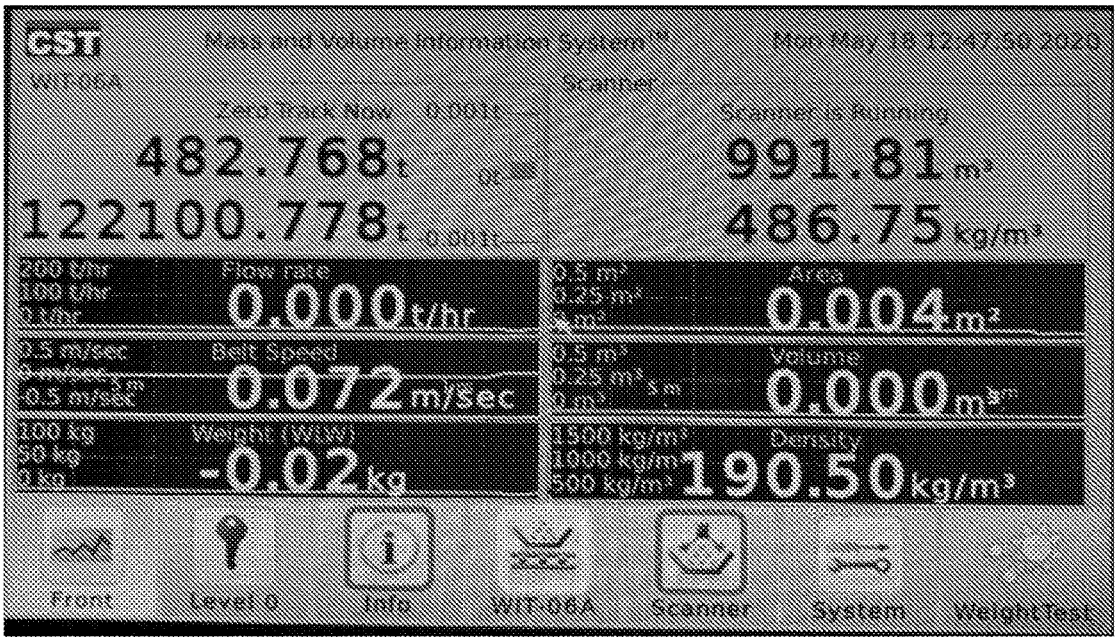
FIG. 21 illustrates an example front page for the automated testing system.

FIG. 21 shows a front page 2100 for a conveyor belt weighing system. The front page 2100 shows information about the conveyor belt and the conveyor belt weighing system and includes information such as flow rate, belt speed, weight, area, volume and density.

Figure 22A:
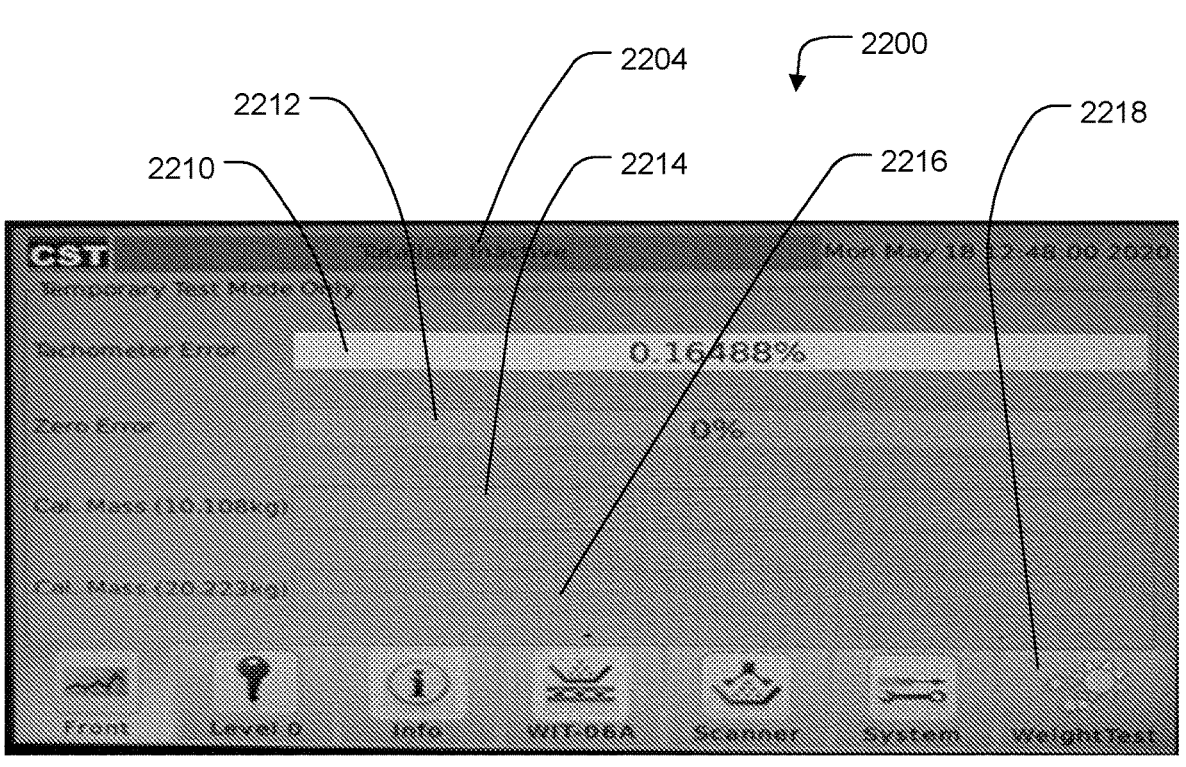
Figure 22B:
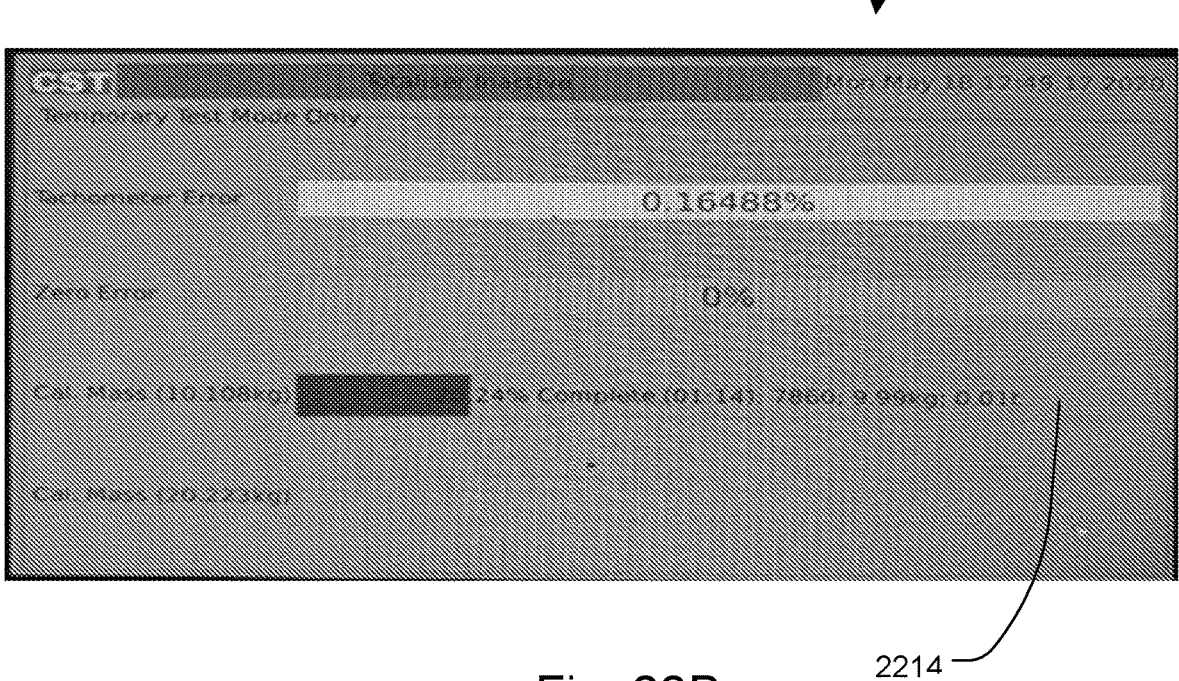
Figure 22E:
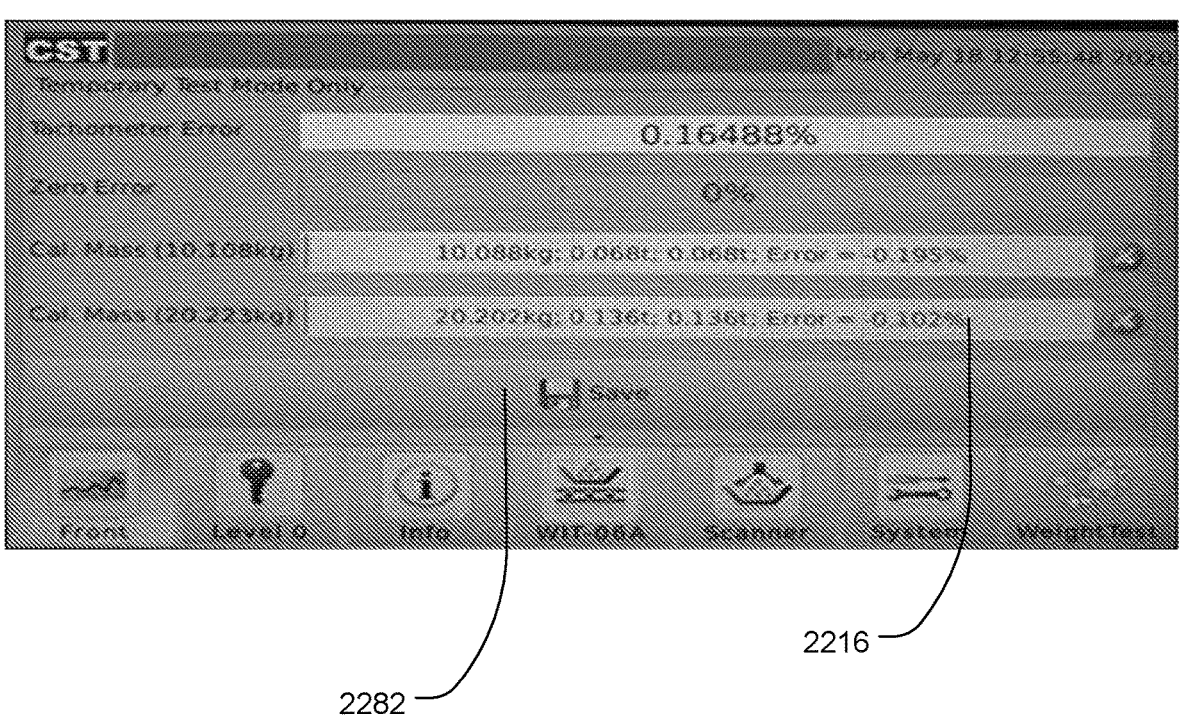

FIGS. 22A to 22E show progress of the weight test described above in relation to the weights test step 2340. The weight test is performed using the two weights, weight 1 and weight 2, shown on the factory weight list page 2000. The weight test page 2200 of FIG. 22A shows results from the tachometer test as tachometer error 2210. The belt scale zero test results are also shown as zero error 2212. Weight 1 progress 2214 and weight 2 progress 2216 are shown as empty as the weight test has not started. The weight test may be started by the operator selecting the weight Test button 2218. At the top of the weight test page 2200 is an indicator 2204 showing the operator that the totaliser is inactive.

Once the weigh test button 2218 is selected the weight test starts. Progress of the weight 1 testing is shown on weight test page 2220 of FIG. 22B where the weight 1 progress 2214 indicates that the weight test, using weight 1, has started. Progress is shown both graphically, using a fill of the weight 1 progress 2214 as a progress bar, and numerically along with test time information and results inside the progress bar.

FIG. 22C shows weight test page 2240 with testing of weight 1 compete. The weight 1 progress 2214 shows error information while the progress bar colour indicate testing of weight 1 is complete.

In FIG. 22D, weight test page 2260 shows testing of weight 2 has started using weight 2 progress 2216. As with the weight 1 progress 2214, weight 2 progress 2216 may operate as a progress bar to graphically display progress of the weight test for weight 2. Progress may also be displayed numerically, along with time information for the test, such as time remaining to test completion, and results.

Results of the completed weight test are shown in weight test page 2280 where the weight 2 progress 2216 progress bar has changed colour to indicate the test for weight 2 is complete. Once the weight test has completed the error between the expected result and the test results is displayed along with values of the expected result and the test result.

While the automated testing system may automatically store the test results the operator may also save the test results using save button 2282.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The invention claimed is:

1. A monitoring system for a conveyor belt weighing system, the monitoring system comprising:

a display device configured to display digital content for the monitoring system, the digital content comprising a status page displaying a plurality of calibration status displays for the conveyor belt weighting system, each of the calibration status displays including a reference calibration value and a comparison between the reference calibration value and a calibration value for the conveyor belt weighing system, wherein the reference calibration value is an ideal value for the calibration value.

2. The monitoring system of claim 1, wherein each of the plurality of calibration status displays have an associated colour coded status indication.

3. The monitoring system of claim 2, wherein the associated colour coded status indication displays a difference between the reference calibration value and the calibration value for the weighing system.

4. The monitoring system of claim 2, wherein the associated colour coded status indications are displayed on a region of the status page.

5. The monitoring system of claim 4, wherein, for each of the plurality of calibration status displays, the associated colour coded status indication is a background of the calibration status display.

6. The monitoring system of claim 1, wherein a sub-system status page is accessible from the status page.

7. The monitoring system of claim 1, wherein a difference between the reference calibration value and the calibration value for the weighing system is displayed on the calibration status display.

8. The monitoring system of claim 1, wherein the comparison is represented in a format selected from the group consisting of a percentage, a difference, an absolute difference and an absolute percentage difference.

9. The monitoring system of claim 1, wherein the comparison provides an assessment of accuracy for the conveyor belt weighing system.

10. The monitoring system of claim 1, wherein the calibration status is selected from the group consisting of belt scale zero, weigh length, belt scale span and tachometer.

11. A method of determining a calibration status for a sub-system of a conveyor belt weighing system, the method comprising:

receiving a reference calibration value for the sub-system, the reference calibration value being set an ideal value for the sub-system;

receiving a calibration value for the sub-system;

determining a difference between the calibration value and the reference calibration value; and displaying the determined difference to an operator of the conveyor belt weighing system to allow the operator to view a change from the reference calibration value.

12. The method of claim 11, wherein the difference has an associated colour coded status indication.

13. The method of claim 12, wherein the associated colour coded status indication displays the difference between the reference calibration value and the calibration value for the weighing system.

14. The method of claim 12, wherein the associated colour coded status indications are displayed on a region of the status page.

15. The method of claim 14, wherein the region on the status page is a background of the displayed difference.

16. The method of claim 11, wherein the difference is displayed on a status page.

17. The method of claim 16, wherein a sub-system status page is accessible from the status page.

18. The method of claim 11, wherein the difference is represented in a format selected from the group consisting of a percentage, a difference, an absolute difference and an absolute percentage difference.

19. The method of claim 11, wherein the difference provides an assessment of accuracy for the conveyor belt weighing system.

20. The monitoring system of claim 11, wherein the sub-system is selected from the group consisting of belt scale zero, weigh length, belt scale span and tachometer.

* * * * *